United States Patent
Diebel

(10) Patent No.: US 8,960,421 B1
(45) Date of Patent: Feb. 24, 2015

(54) FOLDABLE FRONT COVER FOR ELECTRONIC TABLET

(75) Inventor: Markus Diebel, San Francisco, CA (US)

(73) Assignee: Incase Designs Corp., Chino, CA (US)

( * ) Notice: Subject to any disclaimer, the term of this patent is extended or adjusted under 35 U.S.C. 154(b) by 686 days.

(21) Appl. No.: 13/074,001

(22) Filed: Mar. 28, 2011

Related U.S. Application Data

(63) Continuation of application No. 29/387,775, filed on Mar. 17, 2011, now Pat. No. Des. 658,187, and a continuation of application No. 29/388,000, filed on Mar. 22, 2011, now Pat. No. Des. 658,188.

(60) Provisional application No. 61/382,472, filed on Sep. 13, 2010, provisional application No. 61/450,126, filed on Mar. 7, 2011.

(51) Int. Cl.
*B65D 25/24* (2006.01)

(52) U.S. Cl.
USPC .............. 206/45.2; 206/45.23; 206/320

(58) Field of Classification Search
USPC ............. 206/305, 320, 45.2–45.34, 764, 765, 206/576; 361/679.01; 248/460, 459
See application file for complete search history.

(56) References Cited

U.S. PATENT DOCUMENTS

| | | |
|---|---|---|
| 144,315 A | 11/1873 | Cooper |
| 1,347,839 A | 7/1920 | Coons |
| 1,356,593 A | 10/1920 | Bettiker |
| 1,659,395 A | 2/1928 | Douglas |
| D104,699 S | 5/1937 | Pilliod |
| D123,984 S | 12/1940 | Pichel |
| 2,279,164 A | 4/1942 | Gettleman |
| D137,864 S | 5/1944 | Jolles |
| D164,628 S | 9/1951 | Davis |
| D167,065 S | 6/1952 | Bohanan |
| D167,743 S | 9/1952 | Dorfman |
| 2,631,046 A | 3/1953 | Stephens |
| 2,834,703 A | 5/1958 | Atkinson |
| 2,983,431 A | 5/1961 | Turan |
| 3,015,834 A | 1/1962 | Marrinson et al. |
| 3,257,128 A | 6/1966 | Schneider |
| 3,336,610 A | 8/1967 | Geddings |
| 3,460,744 A | 8/1969 | Turkenkopf |
| 3,587,578 A | 6/1971 | Walker |
| D222,602 S | 11/1971 | Petrie |
| 3,735,516 A | 5/1973 | Wenstrom |
| 3,758,065 A | 9/1973 | Ranseen |
| 3,797,146 A | 3/1974 | Holes |

(Continued)

OTHER PUBLICATIONS

Apple Smart Cover Product, Mar. 2, 2011, 36 pages.

(Continued)

*Primary Examiner* — Mickey Yu
*Assistant Examiner* — Chun Cheung
(74) *Attorney, Agent, or Firm* — Aka Chan LLP

(57) ABSTRACT

A foldable cover has panels or sections and hinges that allow the cover to be folded into a stand for an electronic tablet or other electronic device. The front cover protects the front screen of the electronic tablet. The front cover can be folded into a stand to provide multiple viewing angles for the tablet, without needing to carry a separate standalone stand device. The foldable cover can be part of case that houses and protects the electronic tablet. Due to the foldable cover, this case has additional functionality and usability. Since the stand can be formed from the front cover, the stand will be available wherever the case is and is harder to lose than having a separate standalone stand.

90 Claims, 26 Drawing Sheets

(56) References Cited

U.S. PATENT DOCUMENTS

| | | |
|---|---|---|
| D232,825 S | 9/1974 | Gerber |
| 3,970,332 A | 7/1976 | Alford, Jr. |
| D245,458 S | 8/1977 | Hauss |
| 4,044,942 A | 8/1977 | Sherwood |
| D251,082 S | 2/1979 | Petrie |
| D255,523 S | 6/1980 | Yarabinec |
| D255,524 S | 6/1980 | Yarabinec |
| D258,723 S | 3/1981 | Cornou |
| 4,259,568 A * | 3/1981 | Dynesen ............ 206/45.2 |
| 4,310,117 A | 1/1982 | Gullett |
| D274,493 S | 7/1984 | Dyby |
| D275,153 S | 8/1984 | Weinreb |
| 4,520,958 A | 6/1985 | Jones et al. |
| 4,566,720 A | 1/1986 | Goldman et al. |
| D283,231 S | 4/1986 | Bradenburger |
| 4,592,358 A | 6/1986 | Westplate |
| 4,621,729 A | 11/1986 | Jackson |
| 4,629,070 A | 12/1986 | Roberg |
| 4,643,544 A | 2/1987 | Loughran |
| 4,671,334 A | 6/1987 | Yadegar et al. |
| 4,693,495 A | 9/1987 | LaPointe |
| D293,428 S | 12/1987 | Watts |
| D296,006 S | 5/1988 | Asche |
| D297,228 S | 8/1988 | Harpaz et al. |
| 4,787,766 A | 11/1988 | Lorsch |
| 4,877,074 A | 10/1989 | Castellano |
| D306,850 S | 3/1990 | Beedy |
| D308,760 S | 6/1990 | King |
| D310,987 S | 10/1990 | Law et al. |
| D311,688 S | 10/1990 | Hodge |
| D312,130 S | 11/1990 | Jones |
| D312,214 S | 11/1990 | Hodge |
| D312,835 S | 12/1990 | Holm |
| D313,964 S | 1/1991 | Fuller |
| 5,000,319 A | 3/1991 | Mermelstein |
| D317,329 S | 6/1991 | Annand |
| D318,372 S | 7/1991 | Mackey |
| D319,016 S | 8/1991 | Kahl |
| D320,274 S | 9/1991 | Douglas |
| D321,091 S | 10/1991 | Dickinson |
| D321,761 S | 11/1991 | Shimizu |
| 5,066,158 A | 11/1991 | Huang |
| 5,080,316 A * | 1/1992 | MacEwan ............ 248/459 |
| 5,092,354 A | 3/1992 | Pacelli, Jr. |
| D325,637 S | 4/1992 | O'Brien et al. |
| D327,046 S | 6/1992 | Eskandry et al. |
| D329,747 S | 9/1992 | Embree |
| D331,191 S | 11/1992 | Ventola et al. |
| 5,179,944 A | 1/1993 | McSymytz |
| D341,373 S | 11/1993 | Stern |
| D345,014 S | 3/1994 | Huffman |
| D352,357 S | 11/1994 | Ashley |
| D356,120 S | 3/1995 | Allen |
| 5,413,305 A * | 5/1995 | Leeb .................. 248/460 |
| 5,431,449 A | 7/1995 | Arimoto et al. |
| D360,778 S | 8/1995 | Apt, III et al. |
| 5,439,101 A | 8/1995 | Brink et al. |
| 5,450,858 A | 9/1995 | Zablotsky et al. |
| D364,191 S | 11/1995 | Allen |
| 5,480,192 A | 1/1996 | Angerbauer et al. |
| 5,487,566 A | 1/1996 | Hedge, Jr. |
| D369,998 S | 5/1996 | Eskandry |
| D370,177 S | 5/1996 | Bankier |
| D370,650 S | 6/1996 | Eskandry |
| 5,566,871 A | 10/1996 | Weintraub |
| D383,213 S | 9/1997 | Ingram |
| D389,509 S | 1/1998 | Yasoshima |
| D389,646 S | 1/1998 | Sankey et al. |
| D390,007 S | 2/1998 | Ahern, Jr. |
| D391,298 S | 2/1998 | Johnson et al. |
| D405,200 S | 2/1999 | Hines |
| D406,463 S | 3/1999 | Rutledge |
| 5,887,723 A * | 3/1999 | Myles et al. .......... 206/760 |
| 5,902,256 A | 5/1999 | Benaron |
| D411,353 S | 6/1999 | Dickinson et al. |
| 5,996,778 A | 12/1999 | Shih |
| D418,867 S | 1/2000 | Platte, III |
| 6,122,785 A | 9/2000 | Bondie et al. |
| D432,477 S | 10/2000 | Gorodetsky |
| D435,171 S | 12/2000 | Anderson |
| D436,179 S | 1/2001 | Small |
| D442,321 S | 5/2001 | Cheng |
| D445,744 S | 7/2001 | Hsing |
| D446,982 S | 8/2001 | Block |
| 6,289,968 B1 | 9/2001 | Karten et al. |
| D449,927 S | 11/2001 | Dorizas |
| 6,427,371 B2 | 8/2002 | Olson et al. |
| 6,493,969 B2 | 12/2002 | Devos |
| D468,868 S | 1/2003 | Thorpe et al. |
| 6,527,330 B1 | 3/2003 | Steffens et al. |
| D473,939 S | 4/2003 | Hantke et al. |
| D473,940 S | 4/2003 | Hantke et al. |
| 6,539,653 B1 | 4/2003 | Finke |
| 6,568,005 B2 | 5/2003 | Fleming et al. |
| D480,971 S | 10/2003 | DeLuca et al. |
| 6,634,691 B2 | 10/2003 | Henderson |
| D484,736 S | 1/2004 | Sarnoff |
| D487,521 S | 3/2004 | Link |
| D487,551 S | 3/2004 | Lee |
| 6,702,359 B2 | 3/2004 | Armstrong et al. |
| 6,763,942 B1 | 7/2004 | Yeh |
| D494,469 S | 8/2004 | Solowiejko |
| 6,772,879 B1 | 8/2004 | Domotor |
| D496,322 S | 9/2004 | Farney et al. |
| D498,308 S | 11/2004 | Mock |
| D505,041 S | 5/2005 | Lesosky |
| D511,838 S | 11/2005 | Vedra |
| D521,553 S | 5/2006 | Sterman |
| 7,037,021 B2 | 5/2006 | Raschke |
| D527,535 S | 9/2006 | Sturba et al. |
| D538,096 S | 3/2007 | Bartell et al. |
| D538,575 S | 3/2007 | Bartell et al. |
| D544,922 S | 6/2007 | Shaffer |
| D548,782 S | 8/2007 | Nash |
| D550,137 S | 9/2007 | Kraines |
| D551,265 S | 9/2007 | Brinson |
| D553,410 S | 10/2007 | Kramer |
| D557,347 S | 12/2007 | Nishimoto |
| 7,318,521 B2 | 1/2008 | Lau |
| 7,322,063 B2 | 1/2008 | Esimai |
| D564,223 S | 3/2008 | Messineo |
| D565,196 S | 3/2008 | Mock et al. |
| D566,111 S | 4/2008 | Nakagawa |
| D572,709 S | 7/2008 | Nakagawa et al. |
| D574,962 S | 8/2008 | Atkins et al. |
| D581,857 S | 12/2008 | Bogard |
| D581,859 S | 12/2008 | Bogard |
| D581,865 S | 12/2008 | Koza |
| D582,047 S | 12/2008 | Yim |
| D582,475 S | 12/2008 | Guest |
| D583,479 S | 12/2008 | Yim |
| D583,959 S | 12/2008 | Yim |
| D584,141 S | 1/2009 | Smith et al. |
| D584,612 S | 1/2009 | Ianello |
| D587,797 S | 3/2009 | Blanchard |
| D587,812 S | 3/2009 | Uchiyama et al. |
| D592,402 S | 5/2009 | Ahlgrim et al. |
| D596,305 S | 7/2009 | Usui et al. |
| D597,302 S | 8/2009 | Adams et al. |
| D599,286 S | 9/2009 | Horito et al. |
| D599,484 S | 9/2009 | Gray et al. |
| D599,761 S | 9/2009 | Birsel et al. |
| D599,959 S | 9/2009 | Washington |
| D600,699 S | 9/2009 | Johnston et al. |
| 7,584,841 B2 | 9/2009 | Chan et al. |
| D601,369 S | 10/2009 | Mock et al. |
| D602,598 S | 10/2009 | Yim |
| D603,906 S | 11/2009 | Miller et al. |
| D604,727 S | 11/2009 | Chu et al. |
| D605,940 S | 12/2009 | Lin |
| D606,119 S | 12/2009 | Miller et al. |
| D606,120 S | 12/2009 | Miller et al. |
| D606,121 S | 12/2009 | Miller et al. |
| D607,253 S | 1/2010 | McCammon |

(56) References Cited

U.S. PATENT DOCUMENTS

| | | | |
|---|---|---|---|
| 7,643,274 B2 | 1/2010 | Bekele | |
| D609,360 S | 2/2010 | Yim | |
| D609,912 S | 2/2010 | Kyono et al. | |
| D613,062 S | 4/2010 | Romero et al. | |
| D613,982 S | 4/2010 | Wilson et al. | |
| D616,930 S | 6/2010 | Engel et al. | |
| 7,735,644 B2 * | 6/2010 | Sirichai et al. | 206/320 |
| D620,122 S | 7/2010 | Cotton | |
| D620,877 S | 8/2010 | Rusher et al. | |
| D622,061 S | 8/2010 | Higginson | |
| D623,940 S | 9/2010 | Ianello | |
| D624,615 S | 9/2010 | Kusmierz | |
| D627,078 S | 11/2010 | Matsuo et al. | |
| D627,117 S | 11/2010 | Hale | |
| D627,775 S | 11/2010 | Li | |
| D628,004 S | 11/2010 | Moorefield | |
| D628,132 S | 11/2010 | Grzyb et al. | |
| D628,197 S | 11/2010 | Li | |
| D628,705 S | 12/2010 | Usui et al. | |
| D628,706 S | 12/2010 | Usui et al. | |
| D629,914 S | 12/2010 | Hunter | |
| D631,912 S | 2/2011 | Epstein | |
| D632,660 S | 2/2011 | Donowho et al. | |
| D633,388 S | 3/2011 | Andre et al. | |
| D633,673 S | 3/2011 | McKnight | |
| D633,879 S | 3/2011 | Heng et al. | |
| D635,135 S | 3/2011 | Li | |
| D635,564 S | 4/2011 | Li | |
| D637,399 S | 5/2011 | Romero et al. | |
| D638,526 S | 5/2011 | Newman | |
| D638,627 S | 5/2011 | Romero et al. | |
| D640,089 S | 6/2011 | Green et al. | |
| D641,720 S | 7/2011 | Heng et al. | |
| 8,143,982 B1 * | 3/2012 | Lauder et al. | 206/320 |
| 8,253,518 B2 * | 8/2012 | Lauder et al. | 206/45.2 |
| 2002/0162935 A1 * | 11/2002 | Hardy | 248/460 |
| 2003/0104036 A1 | 6/2003 | Gregoire | |
| 2005/0001021 A1 | 1/2005 | Hutchinson | |
| 2005/0021114 A1 | 1/2005 | Hidaka | |
| 2005/0246851 A1 | 11/2005 | Cline | |
| 2008/0167095 A1 | 7/2008 | Kim et al. | |
| 2009/0000169 A1 | 1/2009 | Houssain et al. | |
| 2009/0017883 A1 | 1/2009 | Lin | |
| 2009/0159763 A1 | 6/2009 | Kim | |
| 2009/0194209 A1 | 8/2009 | DeFilippis et al. | |
| 2010/0122924 A1 | 5/2010 | Andrews | |
| 2010/0294909 A1 | 11/2010 | Hauser et al. | |
| 2010/0300909 A1 * | 12/2010 | Hung | 206/320 |

OTHER PUBLICATIONS

Speck PixelSkin HD Wrap Product, Mar. 15, 2011, 4 pages.
Speck CandyShell Wrap Product, Jan. 25, 2011, 10 pages.
Apple iPad Case Product, Mar. 15, 2010, 12 pages.
Apple Smart Cover Product Reference, Mar. 2, 2011, 36 pages.
Speck PixelSkin HD Wrap Product Reference, Mar. 15, 2011, 4 pages.
Speck CandyShell Wrap Product Reference, Jan. 25, 2011, 10 pages.
Apple iPad Case Product Reference, Mar. 15, 2010, 12 pages.

* cited by examiner

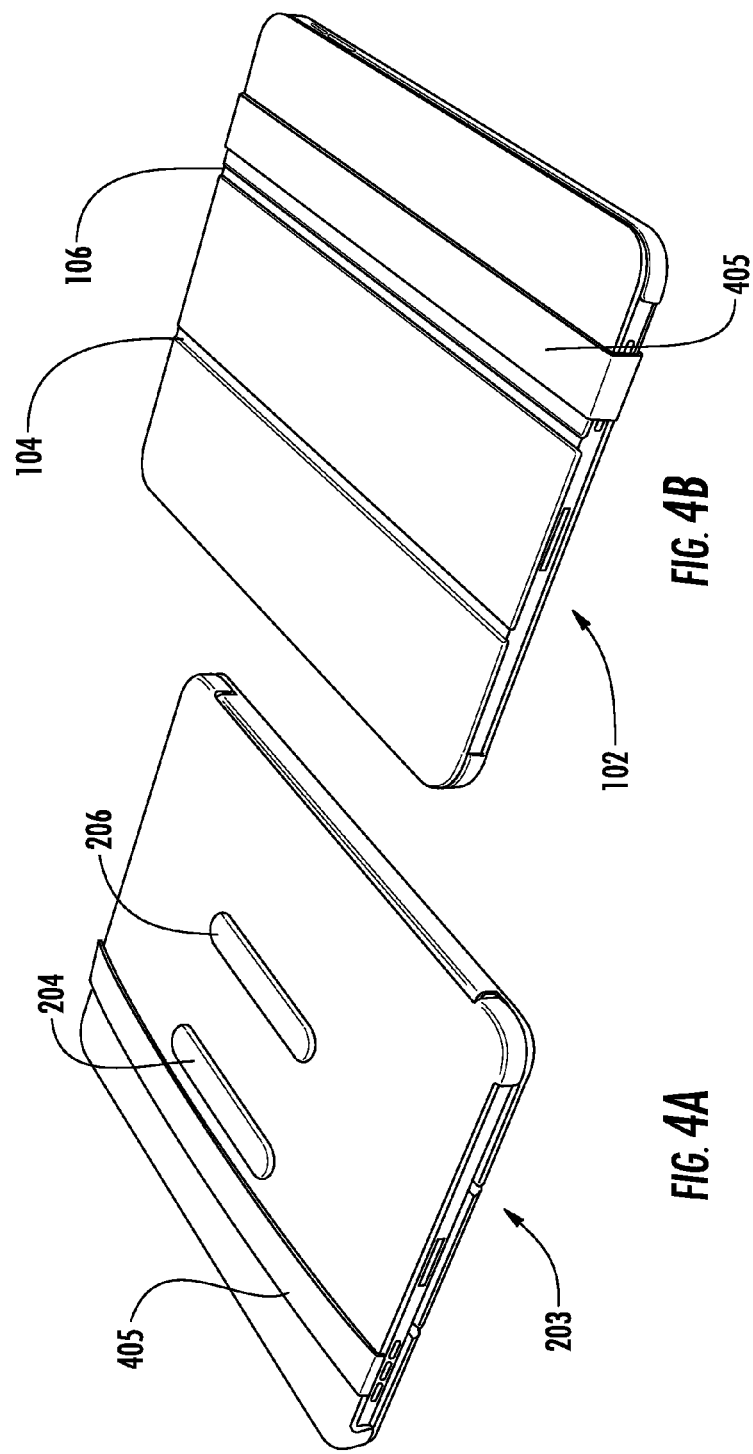

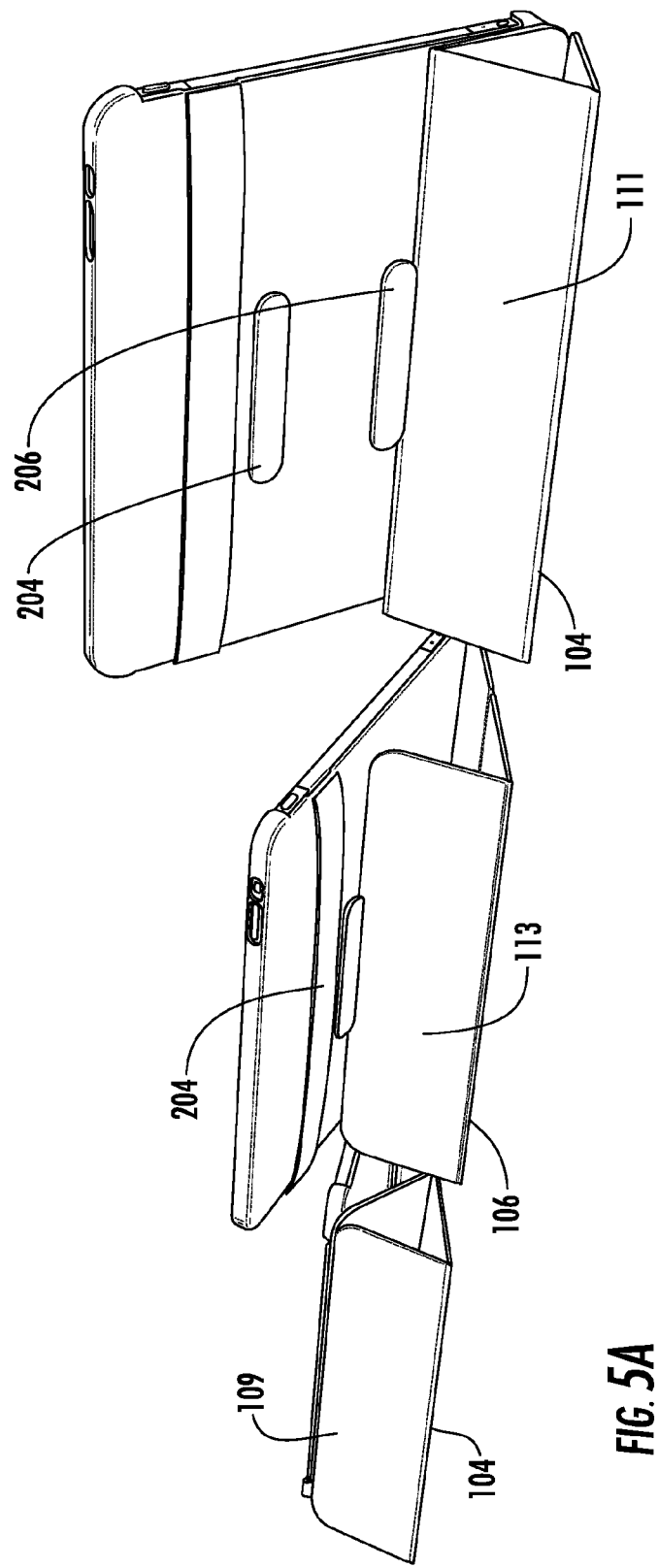

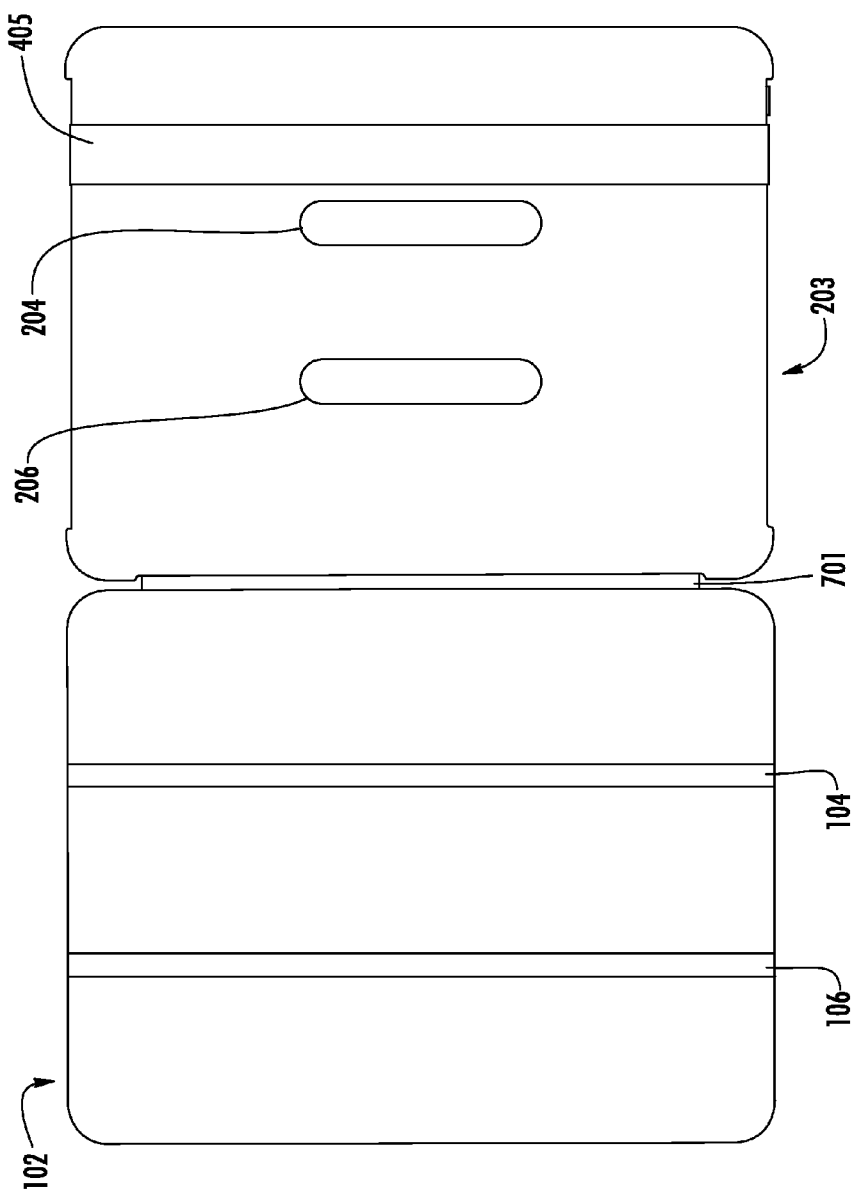

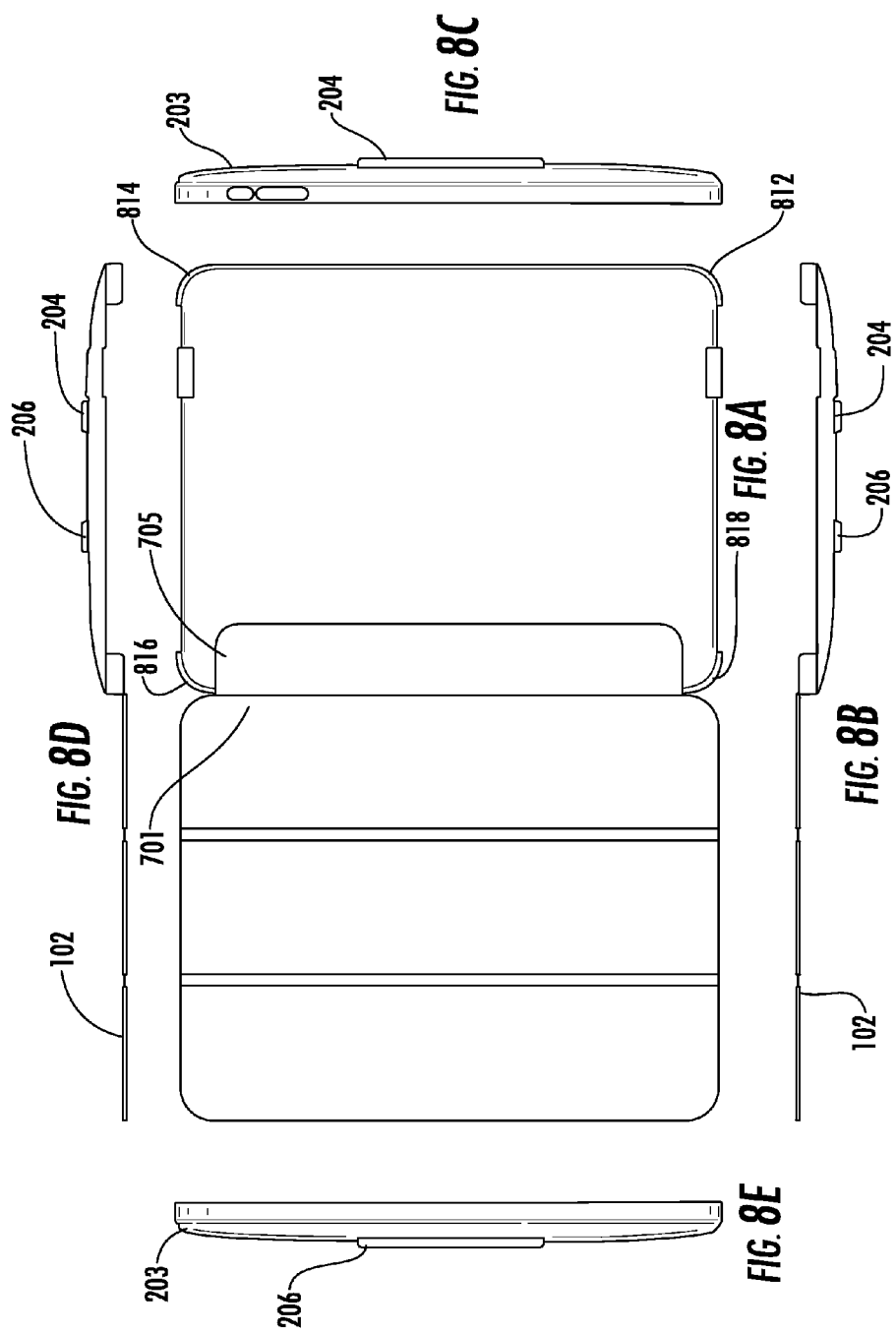

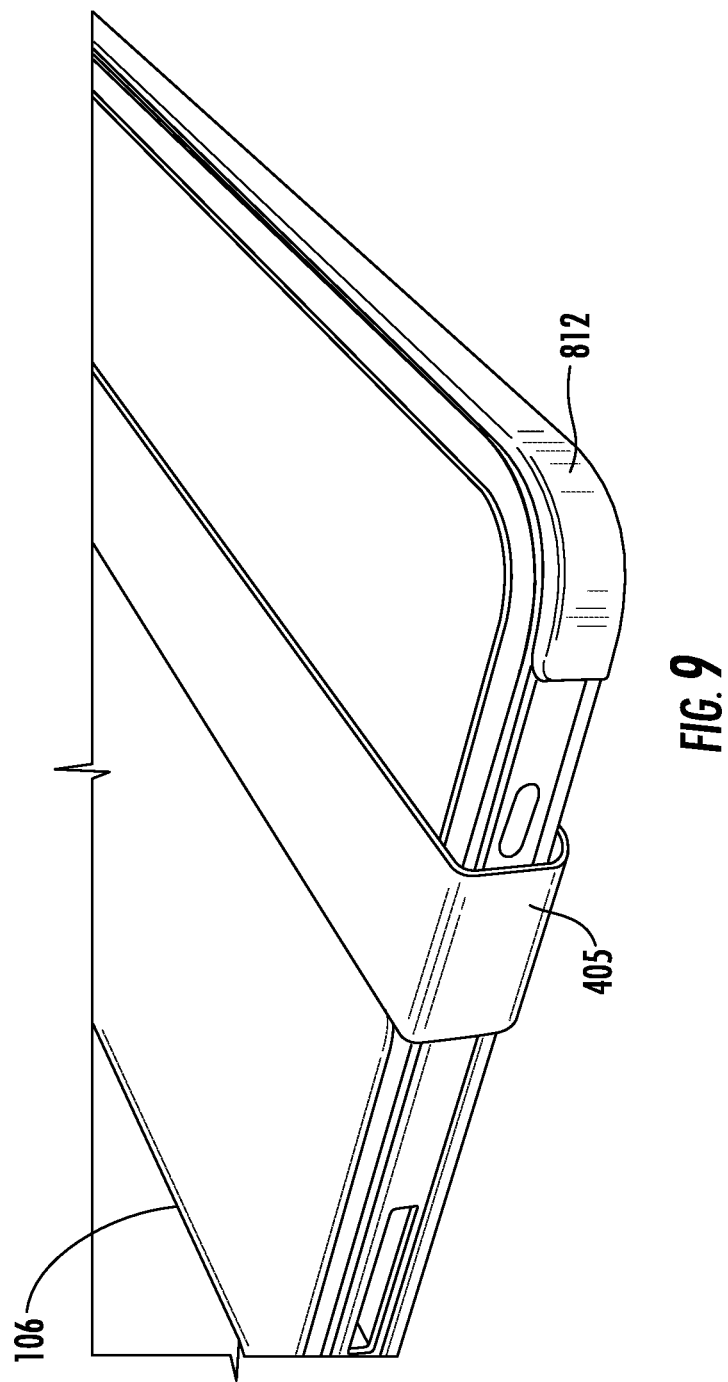

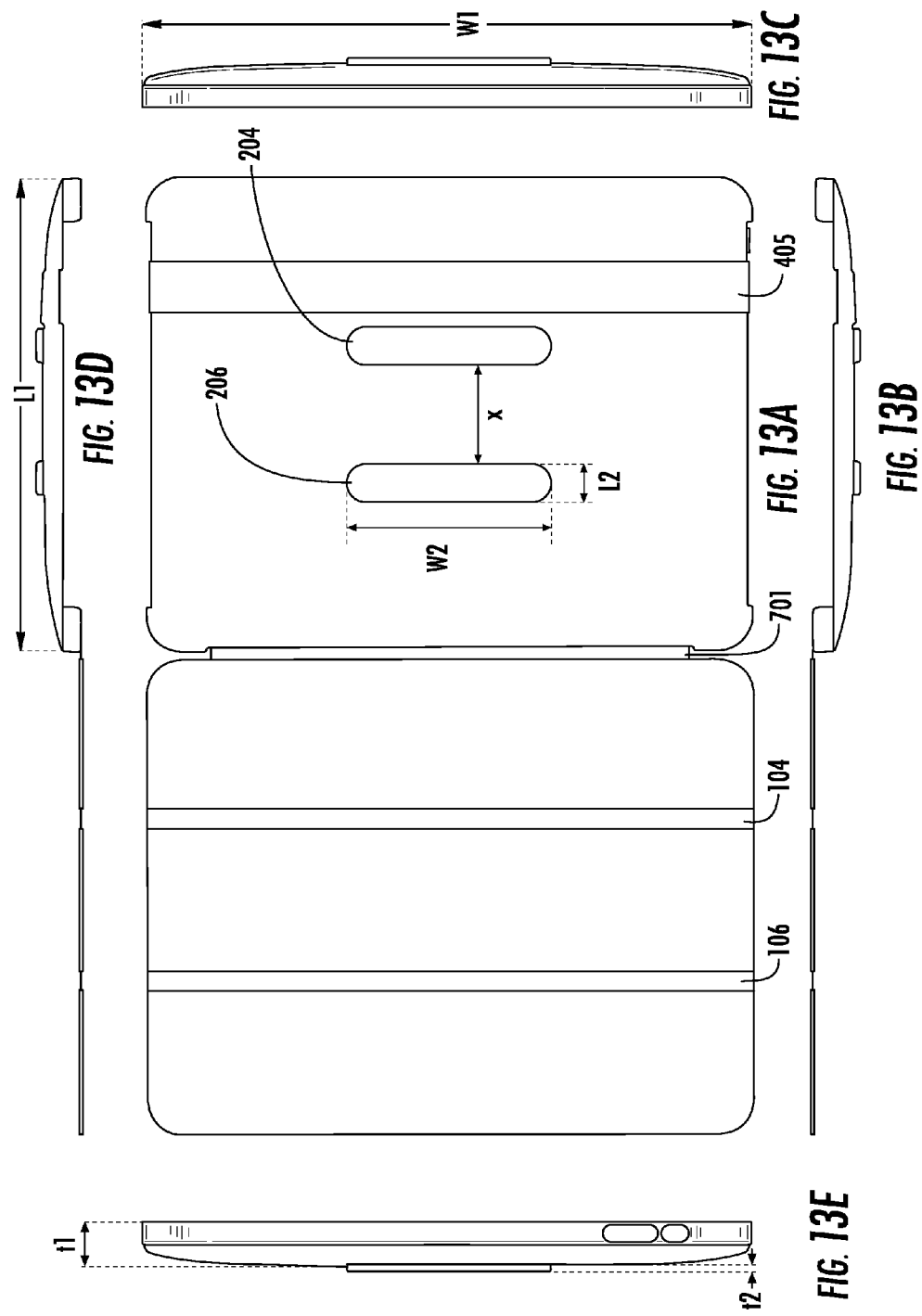

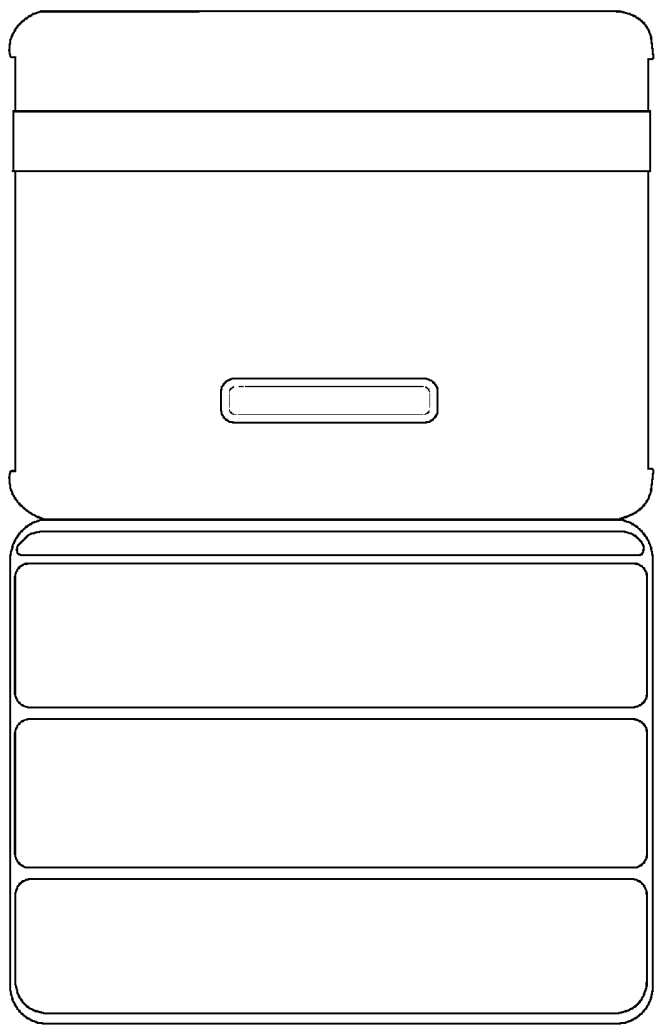

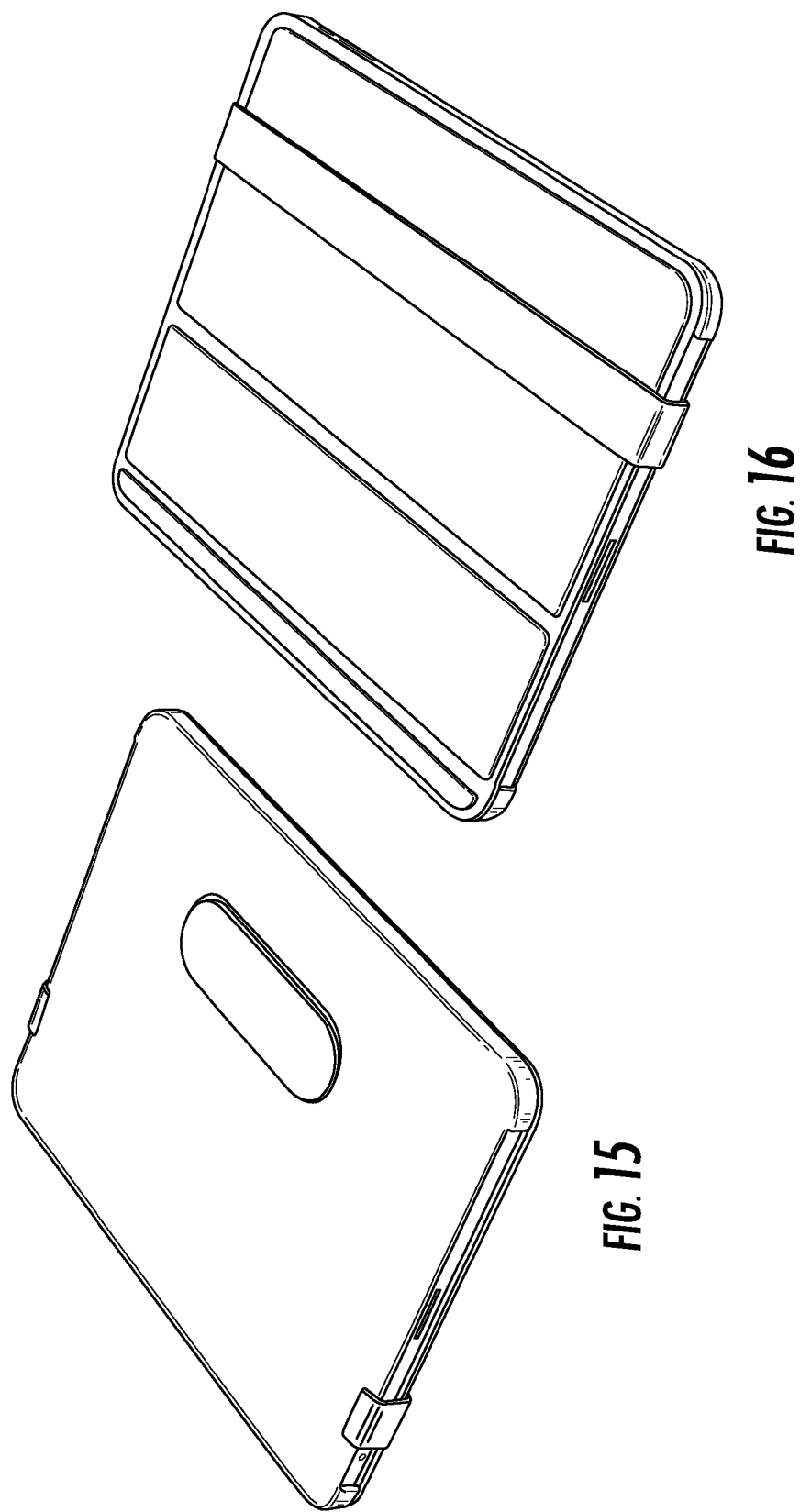

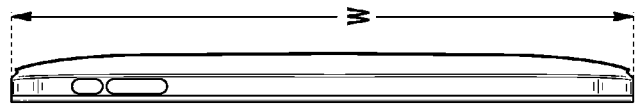
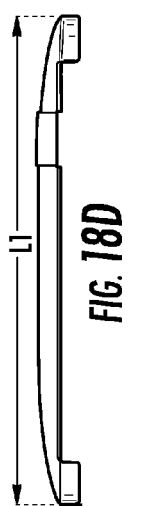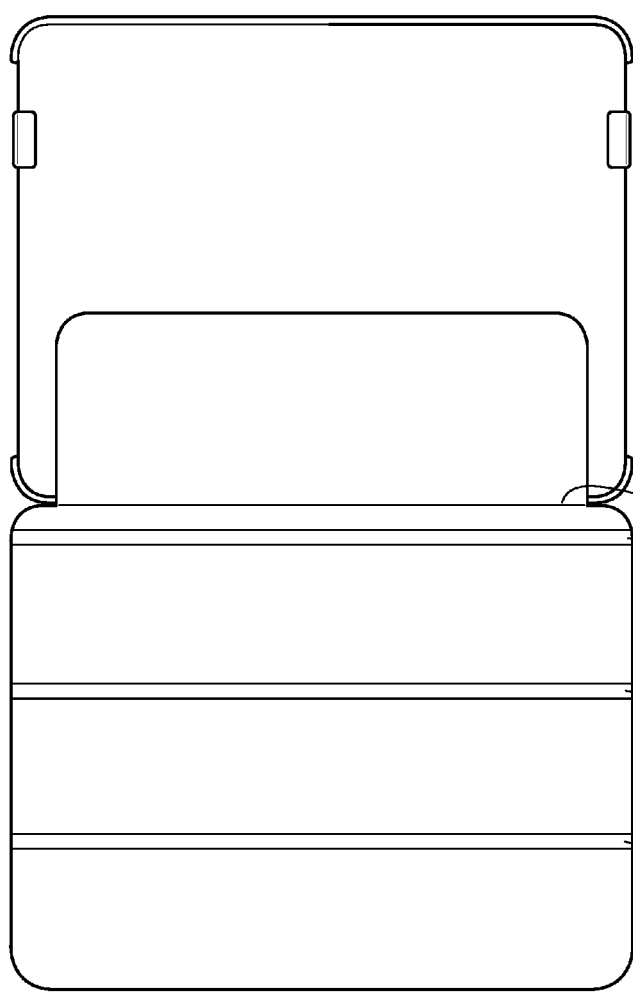
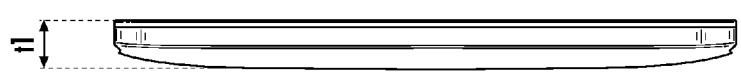

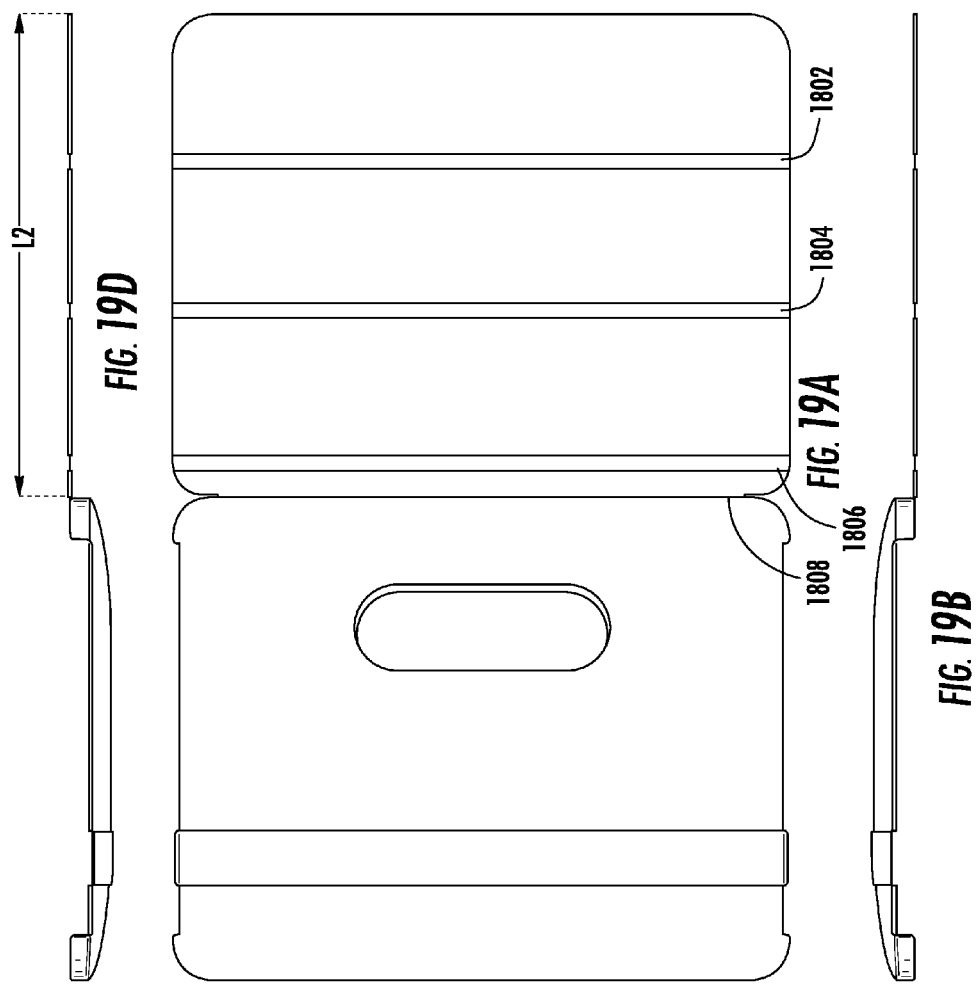

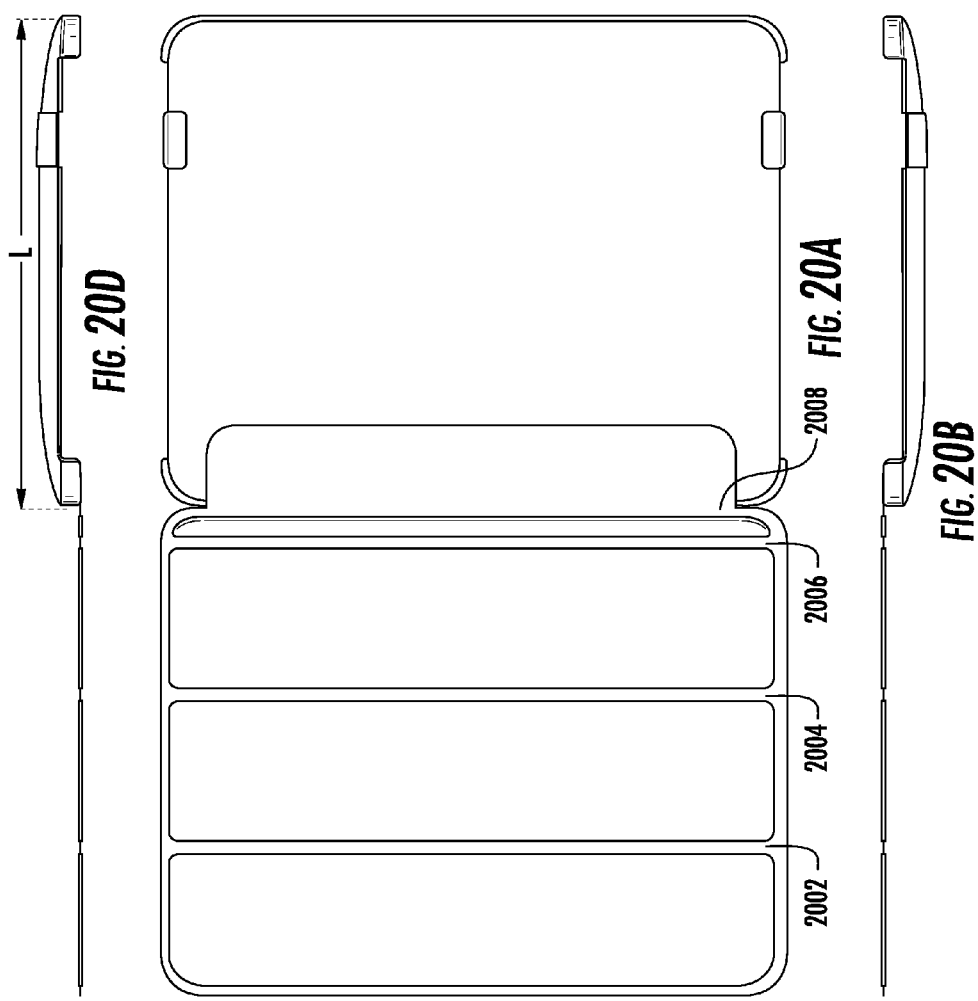

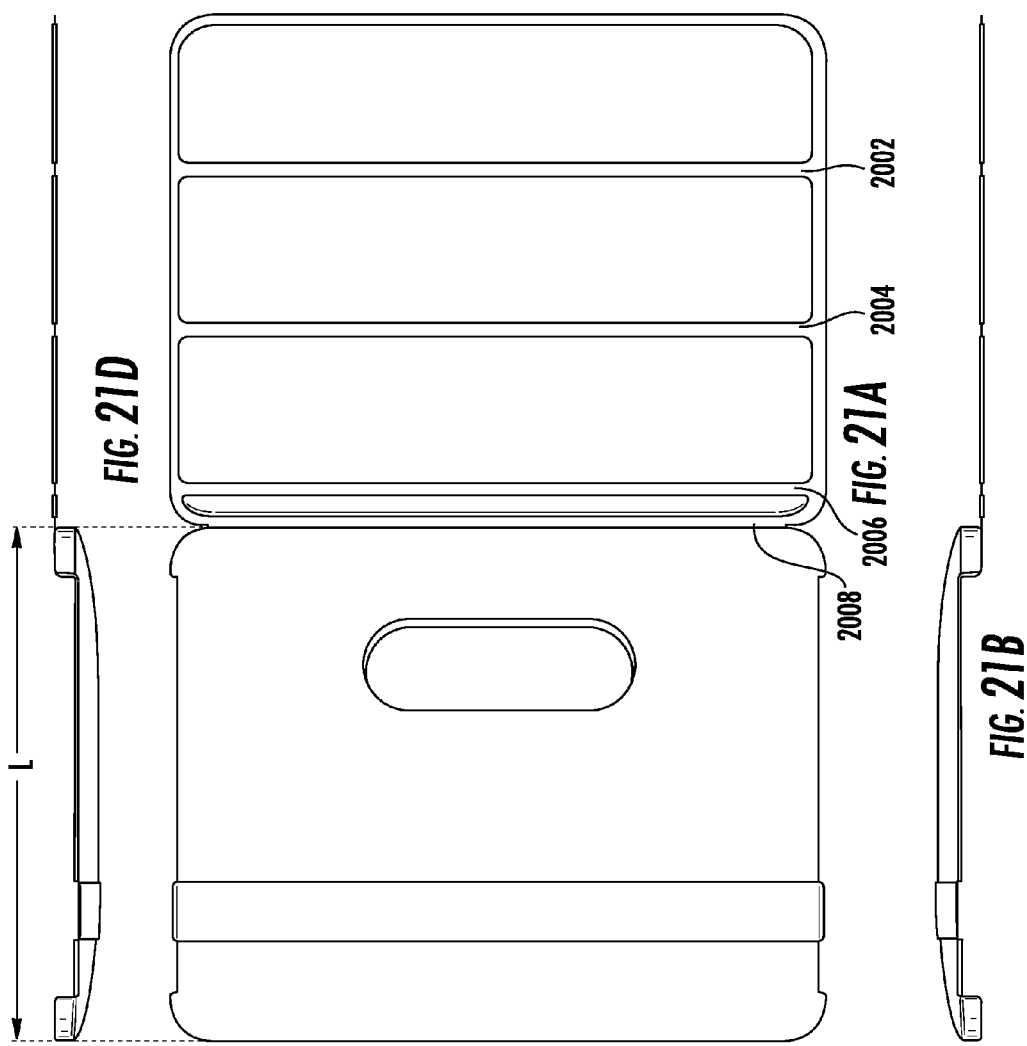

FOLDABLE FRONT COVER FOR ELECTRONIC TABLET

CROSS-REFERENCE TO RELATED APPLICATIONS

This application claims the benefit of U.S. provisional applications 61/382,472, filed Sep. 13, 2010, and 61/450,126, filed Mar. 7, 2011, and is a continuation of U.S. patent application Ser. No. 29/387,775, filed Mar. 17, 2011, and Ser. No. 29/388,000, filed Mar. 22, 2011, which are incorporated by reference along with all other references cited in this application. This patent application also incorporates by reference U.S. provisional applications 61/372,450, filed Aug. 10, 2010, and U.S. patent application Ser. No. 12/892,736, filed Sep. 28, 2010.

BACKGROUND OF THE INVENTION

This invention relates to accessories for electronic devices and more specifically to cases for portable electronic devices and electronic tablets.

With each new generation, portable electronic devices provide greater functionality and have more capabilities. These portable electronic devices allow people to play and record music, send and receive e-mail, send text messages, browse Web pages, make phone calls, play and record video, take and view pictures, edit documents, and much more. These devices continue to revolutionize the way people interact, learn, connect with other people, conduct business, and find things. They help people manage their daily lives and can be a source of entertainment. These devices can be used to store valuable information including personal information (e.g., phone numbers, financial information, private photos or videos, and favorite music tracks).

Typically these devices are intended to be carried or moved about. As such, these devices are more vulnerable to damage as compared to nonportable devices. These devices are more likely to be accidentally dropped, hit, or scratched. Some types of damage may be cosmetic (e.g., scratch). However, other types of damage may ruin or limit the functionality of the device. Often these devices contain sensitive and fragile components (e.g., screen, camera lens, flash, processors, accelerometers, and sensors). Accidentally dropping the device could render various features unusable.

Protective cases are used to protect these devices from possible damage. It is desirable that these cases allow users to use the functionality of their devices, while devices remain in their cases. Cases can also be used to enhance the functionality and capabilities of the device.

Therefore, there is a need for cases for portable electronic devices that will protect the devices, while at the same time enhance the functionality and usability of the devices.

BRIEF SUMMARY OF THE INVENTION

A foldable cover has panels and hinges that allow the cover to be folded into a stand for an electronic tablet or other electronic device. The front cover protects the front screen of the electronic tablet. The front cover can be folded into a stand to provide multiple viewing angles for the tablet, without needing to carry a separate standalone stand device. The foldable cover can be part of case that houses and protects the electronic tablet. Due to the foldable cover, this case has additional functionality and usability. Since the stand can be formed from the front cover, the stand will be available wherever the case is and is harder to lose than having a separate standalone stand.

Incase Designs Corp. of Irwindale, Calif. is a manufacturer of cases for electronic devices including electronic tablet devices. The Incase Web site is www.goincase.com, which is incorporated by reference along with all product packaging and documentation as of the filing date of this application.

In a specific implementation, a case for a portable electronic device (e.g., tablet such as Apple iPad or iPad 2, further described in appendix B of this application) has a rectangular front and back cover, with a hinge between the front and back covers, which connects them together. The front cover has fold lines (e.g., grooves or depressions) on an outside of the front cover. These fold lines along one to fold the front cover into a stand for the case with portable electronic device. There are at least two fold lines.

When the front cover is folded into a first position (working angle 1, about 15 degrees), a side view will be triangular in shape. When the front cover is folded into a second position (working angle 2, about 30 degrees), its top edge is placed or stopped against a first bump on an outside of the back cover. When the front cover is folded into a third position (viewing angle 1, about 60 degrees), its top edge is placed or stopped against a second bump on an outside of the back cover. A case can have more than two fold lines, and this will allow more viewing angles and flexibility. For example, the case can have three fold lines on outside of the front cover. The case can have four fold lines on outside of the front cover. The case can have five fold lines on outside of the front cover.

An inside surface of the back cover includes clips that are used to retain (e.g., snap in) the electronic device in place. The screen of the portable electronic device will be visible and accessible (e.g., touch screen). Other implementations can use other methods of holding the electronic device such as a bezel that partially encloses the face of the electronic device.

As discussed, the back of the back cover of the case includes bumps or ridges. The bumps have a few features: First, they hold the cover in place for two working angles. Second, they keep the case level when put on a surface. Third, they protect the case form scratches and forth they act as a grip (e.g., for the four fingers while the thumb grasp the front cover) when carried.

The case also includes an elastic band or strap the can hold the cover closed onto the front of the electronic device. The elastic strap can be used as a hand strap when the cover is folded back.

The case may be constructed with hardened material, for a hard shell construction around the electronic device. The electronic device may also be fitted to the case by "snapping in" the four corners of the device in specifically designed slots on the corners of the bottom cover of the device to hold the electronic device. The case may also include a rubberized exterior for aesthetic and durability purposes. The sides and covers of the device may also include openings that allow direct access to ports and other features of the electronic device enclosed within. An elastic band extends from the second cover edge to the fourth cover edge. The elastic band can be positioned to hold the outer cover against the front opening, thus preventing rotating of the first and second hinges.

The elastic band or strap may be between the first hinge and the third cover edge. A width of a gap between the third cover edge and the elastic band may be at least a width of the elastic band.

In an implementation, a cover for an electronic device including: a rectangular front cover comprising first, second, and third panels between a first edge and second edge of the front cover, where the first panel is closer to the second edge than the second and third panels, the second panel is between the first and third panels, and the third panel is adjacent the second panel. Between the first panel and second panel is a first hinge. Between the second and third panels is a second hinge. The front cover can be folded to provide at least two stand positions including: a first stand position when the first hinge is rotated so the first panel and second panel have a first angle between them, second hinge is rotated so the second panel and third panel have a second angle between them, where the first and second angles are the same or about the same, and the second panel rests against a surface upon which the stand is formed; a second stand position when the first hinge is rotated so the first panel and second panel have a third angle between them, second hinge is rotated so the second panel and third panel have a fourth angle between them, where the third and fourth angles are the same or about the same, and the first panel rests against the surface upon which the stand is formed.

In various implementations, the first panel is adjacent the second edge. The first angle and the third angle are the same or about the same. The first panel and third panel have the same length dimensions. The second panel is a multiple-layer composite (e.g., three-layer composite) including: an exterior flexible skin layer; an interior flexible skin layer; and a plastic rigid layer between the exterior flexible skin layer and interior flexible skin layer. The plastic rigid layer can be fiberglass, which is a glass reinforced plastic. The plastic rigid layer is nonmagnetic. In an implementation, the cover has a length dimension of at least about 186 millimeters and a width dimension of at least about 241 millimeters, which is sufficient to cover a front surface of the electronic device.

In another implementation, the second panel is a multiple-layer composite (e.g., two-layer composite) including: an interior flexible skin layer; and a rigid layer coupled to the interior flexible skin layer. The rigid layer can be polycarbonate. The interior flexible skin layer can be a thermoplastic elastomer. The rigid layer is attached to the interior flexible skin layer using an adhesive or glue.

For the panels, in an implementation, the first angle is about 60 degrees. The third angle is about 60 degrees.

In an implementation, a method of making a cover for an electronic device includes: providing a flexible interior skin layer; connecting a first rigid panel to the flexible interior skin layer, where the first rigid panel has greater rigidity than the flexible interior skin layer; connecting a second rigid panel to the flexible interior skin layer, where the second rigid panel is positioned with respect to the first rigid panel to have a first uniform gap between the first and second rigid panels of at least X millimeters, wherein X is a number greater than zero, and the first uniform gaps can be operated as a first hinge; connecting a third rigid panel to the flexible interior skin layer, where the third rigid panel is positioned with respect to the second rigid panel to have a second uniform gap between the second and third panel of at least Y millimeters, wherein Y is a number greater than zero, and the second uniform gap can be operated as a second hinge; and allowing rotating of the first hinge and second hinges so the first, second, and third panels form a triangular cross-sectional structure, wherein the triangular cross-sectional structure can become a stand for the electronic device.

In various implementations, X and Y are at least 3 millimeters. The triangular cross-sectional structure can have at least two sides having equal lengths (i.e., an isosceles triangle). The triangular cross-sectional structure can have three sides having equal lengths (i.e., an equilateral triangle).

In an implementation, a cover for an electronic device includes: a front cover including first, second, third, and fourth panels between a first edge and second edge of the front cover, where the first panel is adjacent the second edge, the second panel is between the first and third panels, and the third panel is between the second and fourth panels. Between the first panel and second panel is a first hinge. Between the second and third panels is a second hinge. Between the third and fourth panels is a third hinge. The front cover can be folded to provide at least two stand positions for the electronic device by rotating the first, second, and third hinges. The cover has a rounded rectangular shape with a length dimension of at least about 186 millimeters and a width dimension of at least about 241 millimeters.

Each of the panels is formed using a three-layer composite including: a first flexible layer; a second flexible layer; and a rigid layer between (e.g., encapsulated between) the first and second flexible layers, where the rigid layer has greater rigidity than the first and second flexible layers. The first, second, and third hinges are parallel to each other. The first flexible layer is an exterior layer including polyurethane.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 4A-4B show perspective views of the back and front of the closed case

FIGS. 5A-5C show views of the front cover being used as a stand providing different angles.

FIG. 7 shows a view of the exterior of the case.

FIGS. 8A-8E show various views of the interior of the case.

FIG. 9 shows another view of a retaining clip of the back cover.

FIGS. 13A-13E show views of the case and dimensions of various features in a specific implementation.

FIGS. 14A-14E show an implementation of the case having four panels and three hinges, and a single bump.

FIG. 15-26 show an implementation of the case having four panels and three hinges. Instead of a bump, this implementation has a flap.

DETAILED DESCRIPTION OF THE INVENTION

Figure 1:
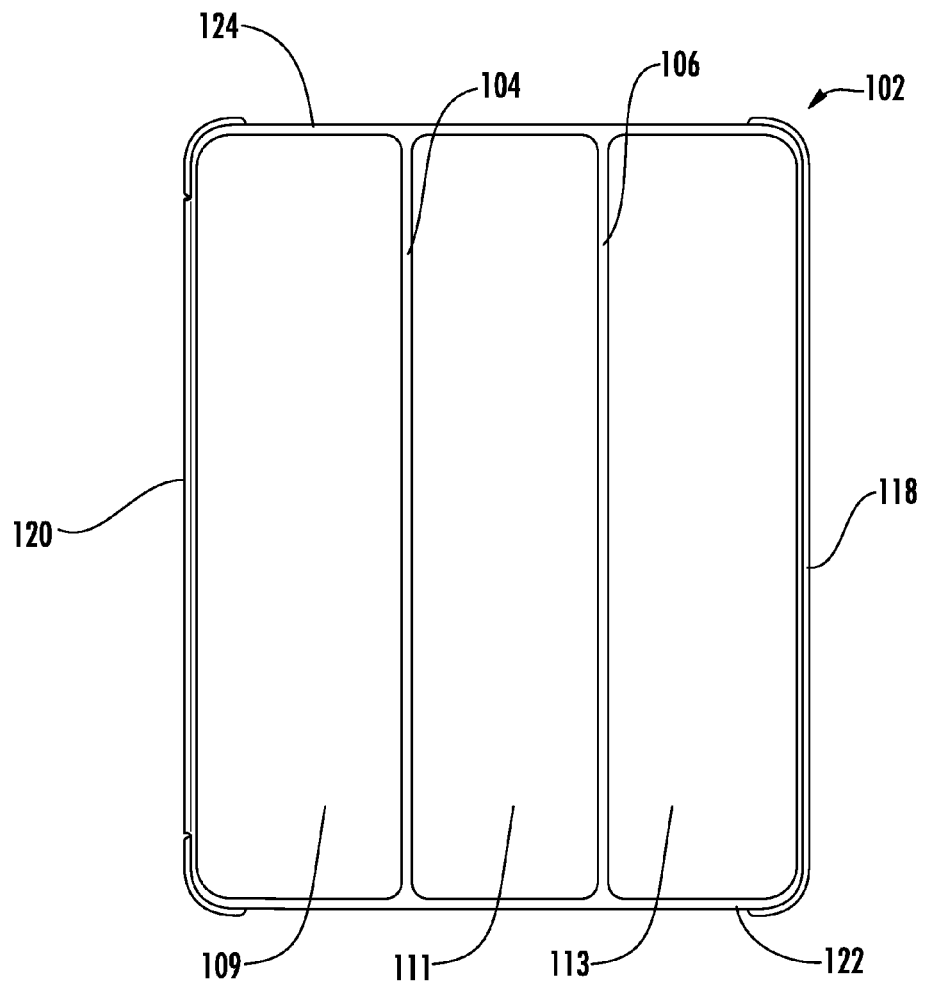
FIG. 1 shows a front cover for a case for a portable electronic device.

FIG. 1 shows a front view of a closed case for a portable electronic device. This embodiment of a case may be referred to as a Convertible Magazine™ Jacket or CMJ™. Additionally, the case may be referred to as Magazine Jacket™ or MJ™. These are trademarks of Incase Designs Corp.

In an implementation, the case is for a tablet computer, tablet PC, or other tablet-type electronic device. Some examples of electronic tablets include Apple iPad, Dell Streak, HP TouchSmart, Toshiba Portege, Fujitsu Lifebook, Lenovo IdeaPad, Toshiba Libretto, Amazon Kindle, Sony Reader, Barnes & Noble Nook, Microsoft Courier, Samsung Galaxy Tab, Notion Ink Adam, Motorola Zoom and others. Aspects of the invention are also applicable to other types of devices including smartphones (such as the Apple iPhone and Google Android phones), personal digital assistants (PDAs), handheld computers, and notebook computers. Any trademarks listed in this patent application are the property of their respective owners.

Portable electronic device are valuable because their functionality, the information they contain, and time and expense to replace. A case is typically much easier and less expensive to replace than the device which it houses and protects.

A case protects the portable electronic device from scratches, dings, dents, and other damage. The case also provides shock absorption. The case will absorb impacts, preventing shock to the components of the device which are often delicate. The case can also improve the grip to the device and case combination. The case may include a texture pattern, be made from a tacky material, or have a tacky coating, or include a wrist or neck strap. The case may also be waterproof or water resistant to protect the device from rain, snow, and surf.

A case may include a battery to lengthen a battery life of the device. A battery case is described in U.S. Pat. No. 7,612,997, issued Nov. 3, 2009, which is incorporated by reference. A case may include a stand (e.g., built-in stand). With such a stand, a user can stand the device on a table and watch the screen hands-free. Some examples of some case designs are in U.S. patent application 61/365,302, which is incorporated by reference along with all other references cited in this application.

This patent application incorporates by reference U.S. Pat. No. 7,612,997, issued Nov. 3, 2009; D587,896, issued Mar. 10, 2009; D582,149, issued Dec. 9, 2008; D581,151; D579, 213, issued Oct. 28, 2008; and D575,056, issued Aug. 19, 2008. These patent applications are incorporated by reference.

A case is typically an important accessory for the device that it protects. For, a person might accidentally drop a portable electronic device in the case on the floor when running to catch a flight for a business trip at the airport. The case may cushion the drop, thus preventing major damage to the portable electronic device. The portable electronic device will remain intact and unbroken, saved by the case. The person can pick up the portable electronic device, continue on the flight, and use the portable electronic device on the business trip.

If the portable electronic device had not been protected by a case, the portable electronic device might have become broken. The screen may become cracked or there might have been other damage rendering the device inoperable. The person typically would not have been able to replace the portable electronic device soon enough, especially if there was important information saved on the portable electronic device (e.g., sales presentation slides) that are needed for the business trip.

Additionally, when using the portable electronic device, a person would at different times need to hold or set the electronic device onto a surface to work on. When the electronic device is set on a surface, it is difficult to view the electronic device if it is laying flush on top of a table. Also, for electronic devices that allow the person to input into the electronic device, it is difficult for a person to manipulate the electronic device if it is flush on a table. Thus, the device allows the person to manipulate the positioning of the electronic device when placed on a table and adjust the angle the electronic device is positioned with respect to the table, to allow easier viewing and working access to the electronic device.

FIG. 1 shows the front view of the closed case for an electronic tablet. The case has a front cover 102, which has hinges 104 and 106, which may also be referred to as fold lines or grooves. The cover has three panels 109, 111, and 113, which are joined by hinges 104 and 106. These panels and fold lines will be used to fold the front cover of the case, so that the cover can act as a stand for the electronic tablet which the case holds. This feature of the case will be discussed in more detail below.

The front cover generally has a rectangular shape with rounded corners. Rounded corners provide a smoother edging without hard angles, which makes sliding into a bag easier and less likely to catch. Rounding also helps prevent bending or dog-earing of the corners.

Edges 118 and 120 and longer than edges 122 and 124. Hinges 104 and 106 appear as lines on the front cover than run parallel (or roughly parallel) to the edges 118 and 120. These hinges run the entire length from one edge 122 to the other edge 124.

Front cover 102 has two hinges. However, in other implementations, front covers of the invention can have more than two hinges, such as three hinges, four hinges, five hinges, or even greater numbers of hinges. The shape and structure of the stand can change as the number of hinges change.

For example, with two hinges and three panels, the stand can have a triangular cross-sectional shape. With three hinges and four panels, the stand can have a square or rectangular shape. Alternatively, with three hinges and four panels, the stand can be triangular (like the two-hinge version), but some panels can overlap panels to increase rigidity. With four hinges and five panels, the stand can have a pentagonal cross-sectional shape. Alternatively, with four hinges and five panels, by overlapping panels, the stand can be triangular (like the two-hinge version) or square or rectangular (like the three-hinge version). As the number of hinges and panels increase, the stand will become more roll like or circular in shape.

Also the shape and the angle provided the stand can vary depending of the size of the panels. Specifically, a length of the panel in the direction from edge 118 to 120. In a specific implementation, each panel is approximately the same length (e.g., 58 millimeters). Then the triangle formed is an equilateral triangle, and the angle provided is about 60 degrees. For a two-hinge stand where only two sides (e.g., panels 109 and 113) are equal and third side is different, the triangle will be an isosceles triangle.

In an implementation, the panels have length and width dimensions 58 millimeters by 236 millimeters. Note that these panel dimensions do not include the join regions and hinges formed by the exterior and interior skins (see below). In further implementation, the panels can have different dimensions such as 34 millimeters by 235 millimeters, 35 millimeters by 238 millimeters, 36 millimeters by 237 millimeters, 51 millimeter by 237 millimeters, and other dimensions, and combinations of these. Therefore, ranges for the length vary from about 30 millimeters to about 60 millimeters. Ranges for the width range from about 220 millimeters to about 245 millimeters.

There can be any combination of panels having different dimensions. For example, for an isosceles triangle, there will be at least two panels having the same dimension (and perhaps three if two panels overlap), and a panel that separate two same-sized panels will have different dimensions. For example, panel 111 is different (e.g., 44, 51, 56, 58, or 102 millimeters) from panel 109 and 113 which have a length of 36 millimeters.

In an implementation, hinges have a length of about 3 millimeters. However, the length can vary and can be different from each other. For example, in other implementations, the length can be 6 millimeters. The greater the length, the greater the thickness of paneling (e.g., overlapping paneling) that the hinge can accommodate. Therefore, ranges for the length range from about 1 millimeter to about 12 millimeters.

Figure 2A:
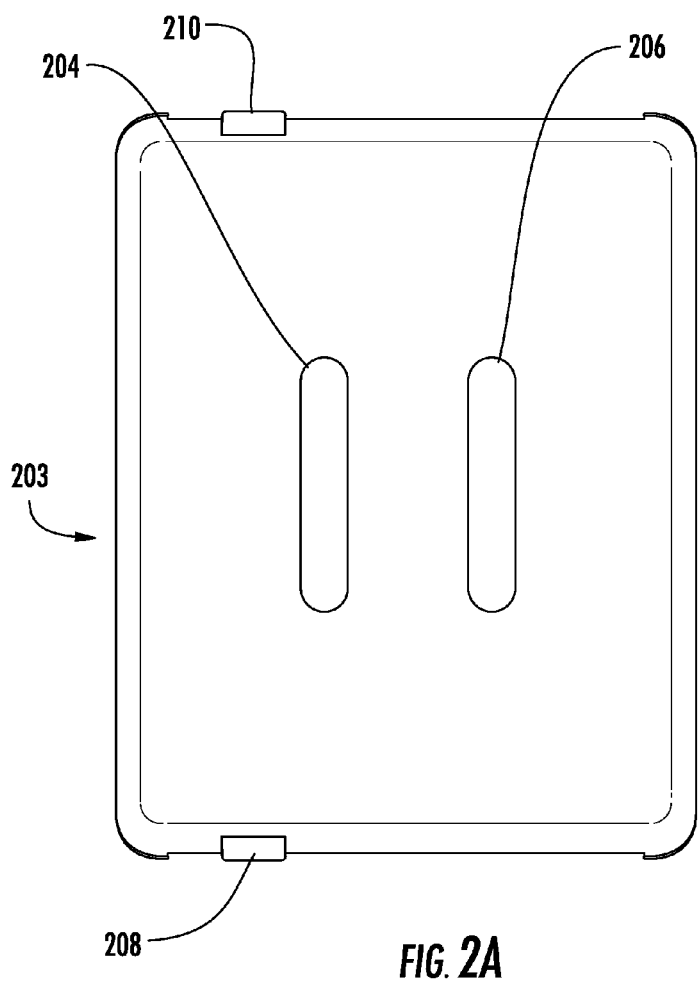
FIG. 2A shows a back cover of the case.

FIG. 2A shows a back view of the closed case. A back surface of a back cover 203 of the case has two pill-shaped bumps or ridges 204 and 206 (which may be referred to as "pills"). The bumps are raised from back surface 203. When the stand sits on a surface such as a table, the bumps of the case touch the table while the rest of back surface 203 is raised off the table. FIG. 2A also shows how an elastic band, which is secure the front cover to the back cover, is attached to the back cover at two attachment points 208 and 210.

Figure 2B:
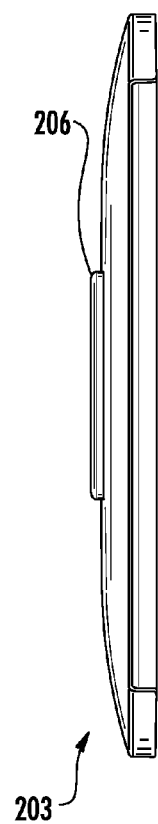
FIG. 2B shows a side view of the case.

FIG. 2B shows a side view of the closed case. Bump 206 is shown from side, which rises above surface 203. In a specific implementation, a height of bump 208 is about 3.5 millimeters. However, in other implementations, the height of the bump can vary depending a number of factors such as how much rise is desired for raising the case off a flat surface.

Figure 3:
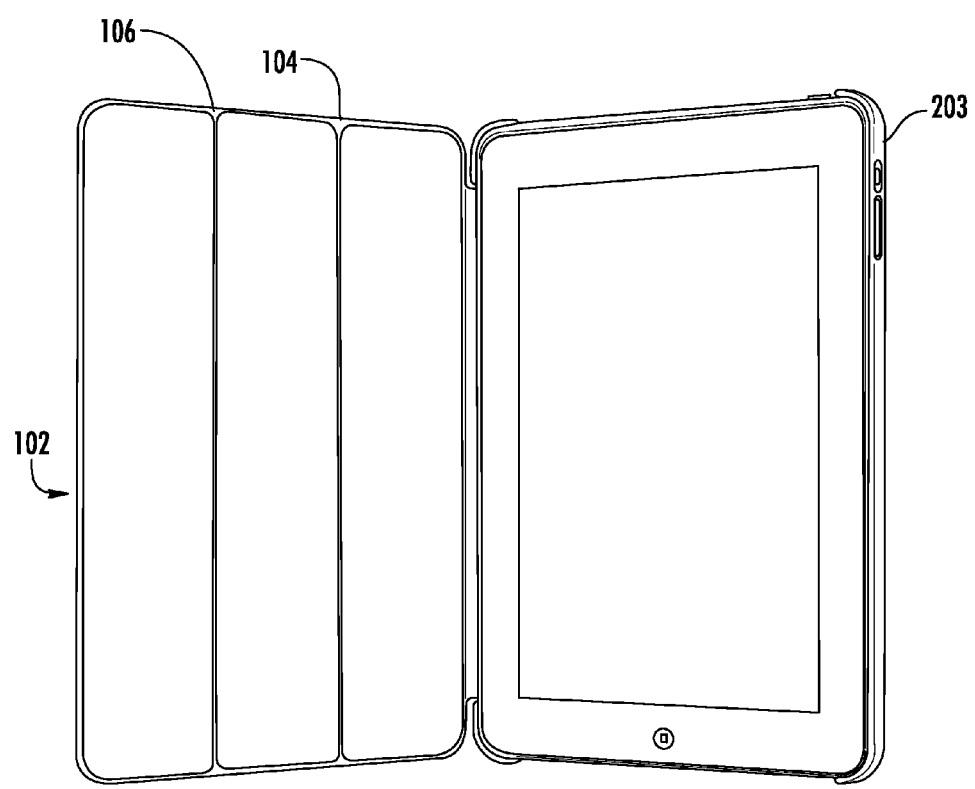
FIG. 3 shows the case being used as a stand in a portrait orientation.

FIG. 3 shows the case opened in a portrait orientation. Front cover 102 of the case can be used as a stand for case with electronic tablet in the portrait orientation. Back cover 203 holds the electronic device. The front cover can be angled with respect to the back cover to support the back cover, so that the case does not fall. The front cover can be positioned less than 180 degrees so the front cover is angled in the front (as shown), or greater than 180 degrees so the front cover is angled to the back.

FIG. 4A shows a back perspective view of the closed case. There is an elastic band or strap 405, which can be used to hold the front and back covers together. In FIG. 4A, the strap is in an open position, resting against the back surface of the back cover. When the strap is in the open position, the front cover of the case is not retained against the front of the back cover by the strap.

The band may also be provided as a strip, i.e., having an end and an opposite end. In another specific implementation, the elastic band is provided as a loop, i.e., a continuous strip or circle of band material.

The band may be referred to as a belt, strap, strip, or cord. Typically, the band is thin so that it remains unobtrusive. A cross section of the band is rectangular and when viewed in cross section the band has a length that is substantially greater than a width. Alternatively, the band can be thick. The band can have a square cross section or a circular cross section (e.g., bungee cord).

In a specific implementation, the band includes an elastic type material that is capable of being easily stretched and recovering size and shape after deformation. The band may include materials such as rubber, silicone, gum, latex, cloth, fabric, nylon, leather, or combinations of these. Alternatively, the band may be designed so that it is not to be stretched like a rubber band. In this specific implementation, the band may be webbing, i.e., a strong narrow closely woven fabric. Buckles, hook-and-loop fasteners, buttons, and the like may be provided so that the band webbing can removably secure the front flap to the back flap.

The front cover can be opened and flipped around to the back of the back cover. The front cover can be inserted underneath strap 405 on the back, so that the front cover is secured against the back of the back cover, leaving the screen of the device visible. The strap can also be used as a hand strap for the user to hold the case and tablet more securely.

FIG. 4B shows a front perspective view of the closed case where elastic band 405 is used to hold the front cover against the back cover. The elastic band here secures a front flap of the case against the screen of the electronic device (and front of the back cover) so the front cover will not accidently open. This protects the screen and device from damage.

FIGS. 5A-5B show different rear perspective views of the case in different angles. As discussed above, the front cover of the case can be folded to act as a stand for the electronic device. Specifically, the panels 109, 111, and 113 and grooves 104 and 106 of the front cover are folded to create a triangular structure that can act as a stand for the case electronic tablet. Depending on the folding of the panels, the stand of the case device provides at least two different working angles and one viewing angle.

Figure 5D:
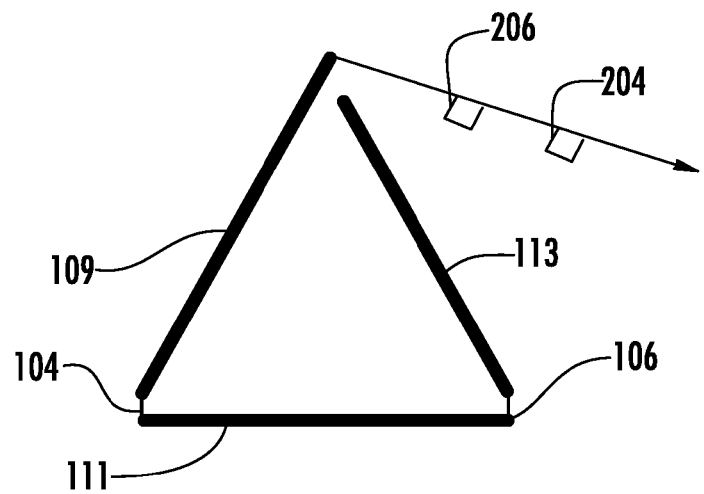
FIGS. 5D-5F show cross-sectional views of the front cover as a stand for different angles.

FIG. 5A shows the device in a first working angle. When placed on a table, the electronic device is held at approximately 15 degrees with the table. For this stand configuration, a cross section of the panels and hinges of the triangular structure is shown in FIG. 5D (as viewed from a left side of the case). Panel 111 sits on the surface (e.g., table) where the stand is placed. Panels 109 and 113 form the triangle with respect to panel 111.

When the panels have the same length, the sides of the triangle have the about the same length, and the triangle becomes an equilateral triangle. The internal angles will be about 60 degrees. This stand angle can be used for typing on an electronic tablet (utilizing the tablet's on-screen keyboard).

Figure 5E:
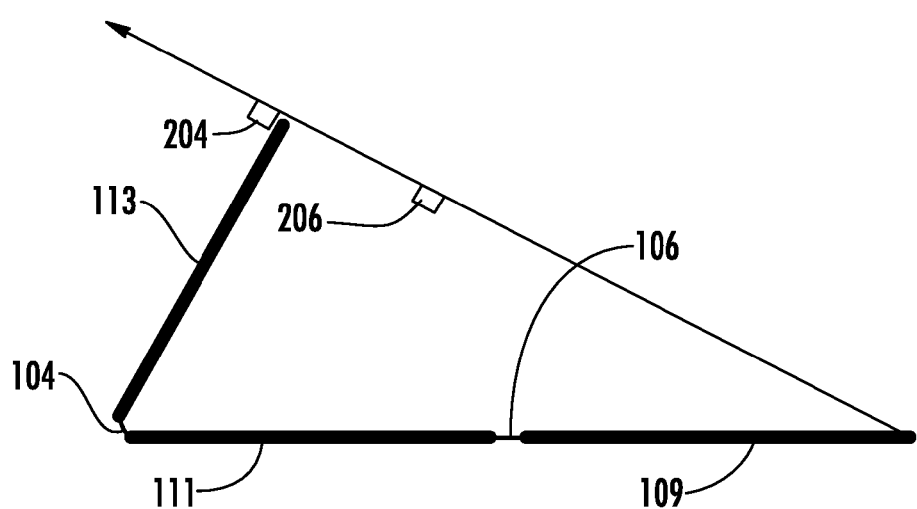

FIG. 5B shows the device in a second working angle. When placed on a table, the electronic device is held at approximately 30 degrees with the table. For this stand configuration, a cross section of the panels and hinges of the triangular structure is shown in FIG. 5E (as viewed from a left side of the case). Panels 109 and 111 lie flat on the surface (e.g., table). Panel 111 angled with respect to panels 109 and 111, and is held in place by bump 204. The resulting cross section is triangular also, where a first side include panel 111 and 109, a second side includes panel 113, and a third side include back surface 203 of the back cover.

The angle provided by the stand can be changed by varying the positioning of bump 204, or by altering the length of panel 113. So, the angle can be varied in a range from about 15 degrees to about 60 degrees.

Figure 5F:
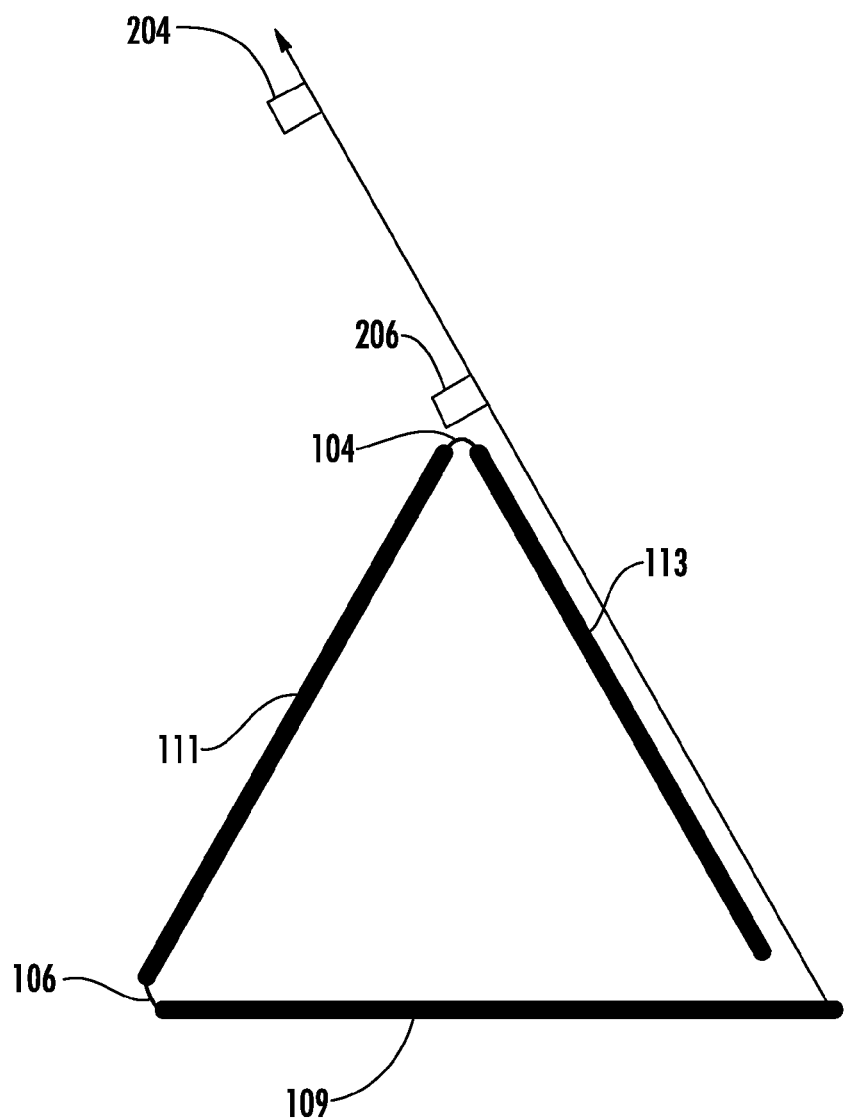

FIG. 5C shows the device in a viewing angle. When placed on a table, the electronic device is held at approximately 60 degrees with the table. For this stand configuration, a cross section of the panels and hinges of the triangular structure is shown in FIG. 5F (as viewed from a left side of the case). Panel 109 sits on the surface (e.g., table) where the stand is placed. Panels 111 and 113 form the triangle with respect to panel 119. The stand is held in place by bump 206, which is placed against panel 111. In various implementations, the bump 206 is optional.

When the panels have the same length, the sides of the triangle have the about the same length, and the triangle becomes an equilateral triangle. The internal angles will be about 60 degrees. This stand angle can be used for viewing media (e.g., watching a movie) on an electronic tablet.

The angle provided by the stand can be changed by altering the lengths of various panels. For example, the length of panel 111 can be made longer than 113 and 109. Then the angle will be generally increased to more than 60 degrees. By doing the reverse (i.e., shortening panel 111), the angle can be decreased to less than 60 degrees.

Therefore, the angle can be varied in a range from about 30 degrees to 75 degrees (or even closer to 90 degrees).

In various implementations of a case according to the invention, there can be more angles (e.g., more than three different angles) than described here, and different angles (e.g., 8, 20, 35, 40, 50, 55, 65 degrees, and others). For example, by adding additional bumps (or panels and hinges), the case can provide additional or different angles. The back has two bumps to give the case multiple viewing angles. In alternate implementation, there can be varying number of bumps (e.g., 1, 3, 4, and others). The more bumps, generally the more viewing angles possible.

Figure 6:
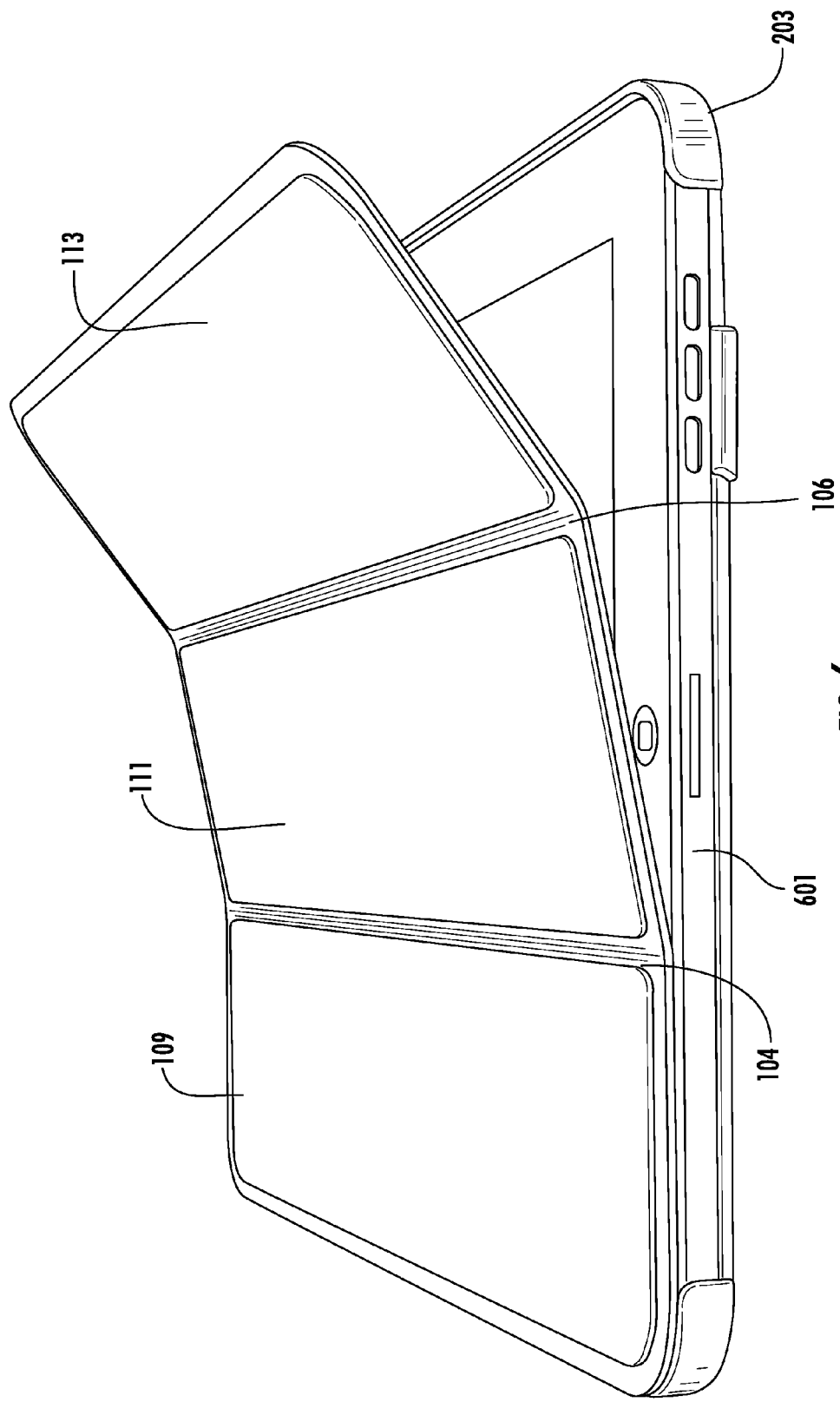
FIG. 6 shows a view of the front cover being partially opened.

FIG. 6 shows a view of the case partially opened, showing partial operation of the hinges. The panels 109, 111, 113 are partially peeled away from against the screen of the tablet (e.g., closed case position). Hinges or fold lines 104 and 106 are slightly bent or rotated in a first direction. As viewed from a left side of the case, the direction of rotation is in counter-clockwise direction. As viewed from a right side of the case, the direction of rotation is in clockwise direction.

Further rotating of the panels in the first direction will form the stand positions as discussed above. As shown in this figure, the left side of the case has an open area 601 that is not obscured by structure of the case. This allows access to the ports, buttons, and other features of the electronic tablet.

FIG. 7 shows a view of an exterior of the case when opened. A hinge 701 is between the front and back covers.

FIG. 8A shows a view of an interior of the case when opened. An extension region 705 (or attachment region) of the front cover 102 connects to the rear cover 203, joining them together. The extension region can be connected to the rear cover using an adhesive, glue, fusing, or other bonding. Between extension region 702 and panel 109 is hinge 701. Hinge 701 is a hinge that allows rotation of the entire front cover relative to the back cover.

In an implementation, extension region 702 is bonded to the back cover on the interior of the case. Then, when the case is closed, the extension region will not be visible on the exterior of the case. But in other implementations, the extension region can be on the exterior of the case.

Further, the extension region can include a panel to stiffen or give rigidity to it. This can help improve adhesion between the extension region and back cover.

In specific implementation, the extension region has a width that is less than the width of the other portions of the front cover. For example, the width of the extension is about 195 millimeters while the rest of the cover is about 243 millimeters. And a length of the extension is about 30 millimeters. The larger area the extension region, the greater the area that can be bonded between the front and back covers.

In an implementation, hinge 701 has a length of about 10 millimeters while hinges 104 and 106 are about 3 millimeters. The width of hinge 701 is about 198 millimeters while hinges 104 and 106 are about 243 millimeters. The increased length of hinge 701 allows wrapping around a tablet of a specific thickness (e.g., 13.4 millimeters). With thinner tablets, a shorter hinge can be used, while for thicker tablets, a longer hinge can be used. For example, for a tablet with a thickness (or depth) of about 8.8 millimeters, hinge 701 can be about 6 to 7 millimeters.

In an implementation, the side hinge is an extension of the material from the front cover 102. In another implementation, the side hinge is separately constructed and then connected with the front cover through, for example, bonding or using glue.

Figure 8F:
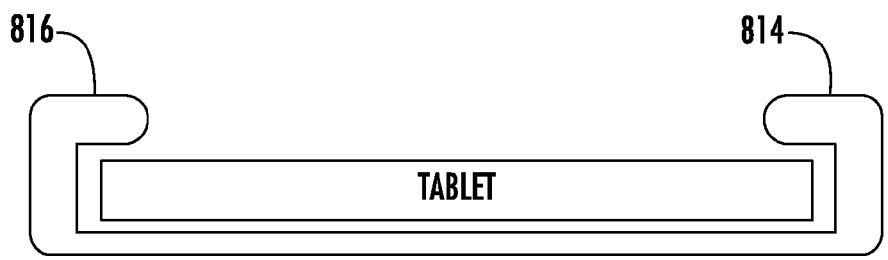
FIG. 8F shows a close-up view of retaining clips and an electronic tablet.

FIG. 8A also shows retaining clips integrated in the back cover that are used to hold the electronic tablet in the back cover of the case. FIG. 8F shows a close-up view of a retaining clip or tab and tablet, and how the tablet is held by the clip against an inside surface of the back cover. The retaining clips elastically deform so that the tablet can be inserted and removed from the case multiple times.

The clips are positioned on the back cover to hold the four corners (e.g., rounded corners) 812, 814, 816, and 818 of the tablet. In a specific implementation, retaining clip 812 and 814 are formed using a single retaining clip that extends across the width of the case. FIG. 9 shows another view of retaining clip 812 and how it extends across the front edge of the case. The clips of the device snap onto the corners of the electronic device and secure it into place. The case here is also chamfered or beveled, which is discussed further below.

FIG. 8B shows a view of the case from a left side. FIG. 8C shows a side view from a front. FIG. 8D shows a side view from a right side. FIG. 8C shows a side view from a back, rear, or spine.

FIG. 9 shows greater detail of edge welding around a border or edging of front cover. The edge welding results in a thinner edging (thinner than the paneled regions) around the entire front cover. This thinner edging is about the same thickness as the thickness of the hinge regions.

Figure 10:
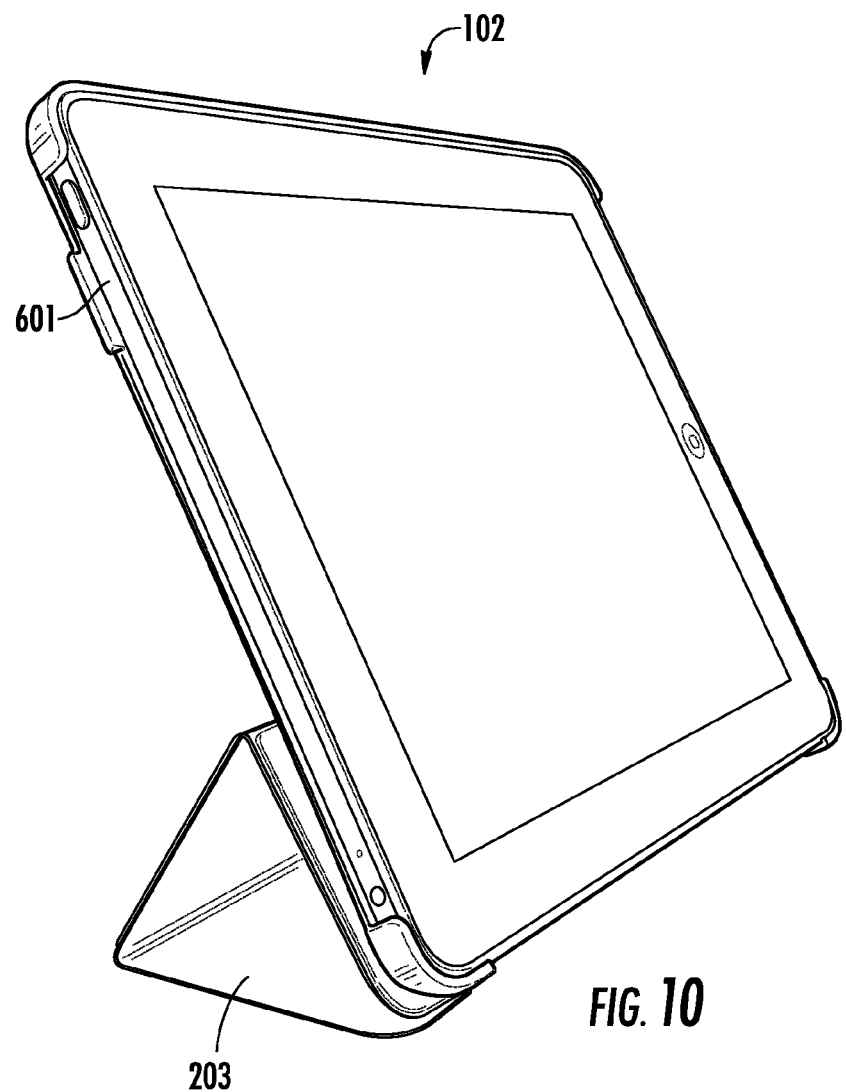
FIG. 10 shows a perspective view of the case in a viewing angle.

FIG. 10 shows a front perspective view of the case being used in the viewing angle (e.g., 60 degrees). This angle can be used by a salesperson to make presentations to prospective customers.

Figure 11:
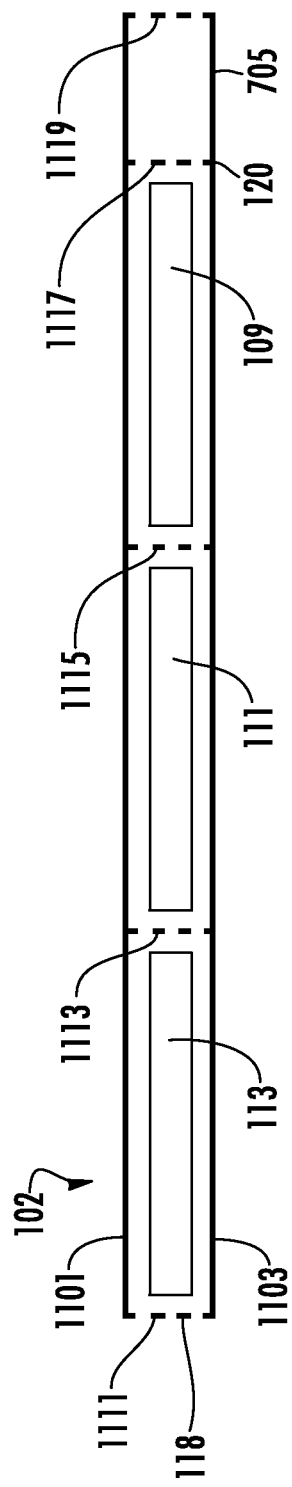
FIG. 11 shows details of a construction of the front cover of the case.

FIG. 11 shows details of a construction of the foldable front cover of the case. FIG. 11 shows a cross sectional view of the components to make the sectional front cover. The front cover is a composite of multiple materials. There is an exterior skin layer 1101 and an interior skin layer 1103. The exterior skin layer is the surface of the front cover that is forms the exterior of the case. The interior skin layer is the surface of the front cover forms the interior of the case; the interior skin layer faces the screen of the tablet when the case is closed.

Between the exterior and interior skin layers are the panels 109, 111, 113. The skins layers lock the panels between them to form the sections (or panels) of the front cover that are used to form the stand. The skin layers are connected together (e.g., by welding, bonding, fusing, or adhesive) at points 1111, 1113, 1115, and 1117 to hold the panels in place. Join points 1113 and 1115 will become hinges or fold lines 106 and 104, respectively.

In a specific implementation, to make a hinge, the interior and exterior skins are sealed or otherwise fused together to form a seam. This seam becomes a flexible point because, in comparison to the rigid panels that the seam is formed in between, it is flexible. This allows the panels to swing in relation to each other, at the seam point.

Other hinges and techniques of forming hinges may be used in a case of the invention. Some hinges include fabric hinges, living hinges, plano hinges, continuous hinges, butt hinges, butterfly hinges, flush hinges, barrel hinges, concealed hinges, and spring hinges. The hinge can be made from materials including fabric, leather or other natural skin materials, synthetic leather, microfiber or polyester, metal (e.g., brass), plastic (e.g., polypropylene, polyethylene, or thermoplastic), rubber, silicone, carbon fiber, and others.

In a specific implementation, at the edges of the front cover, the interior and exterior skins are edge welded. This keeps the panels between the skins from falling out from between the skins.

Figure 22:
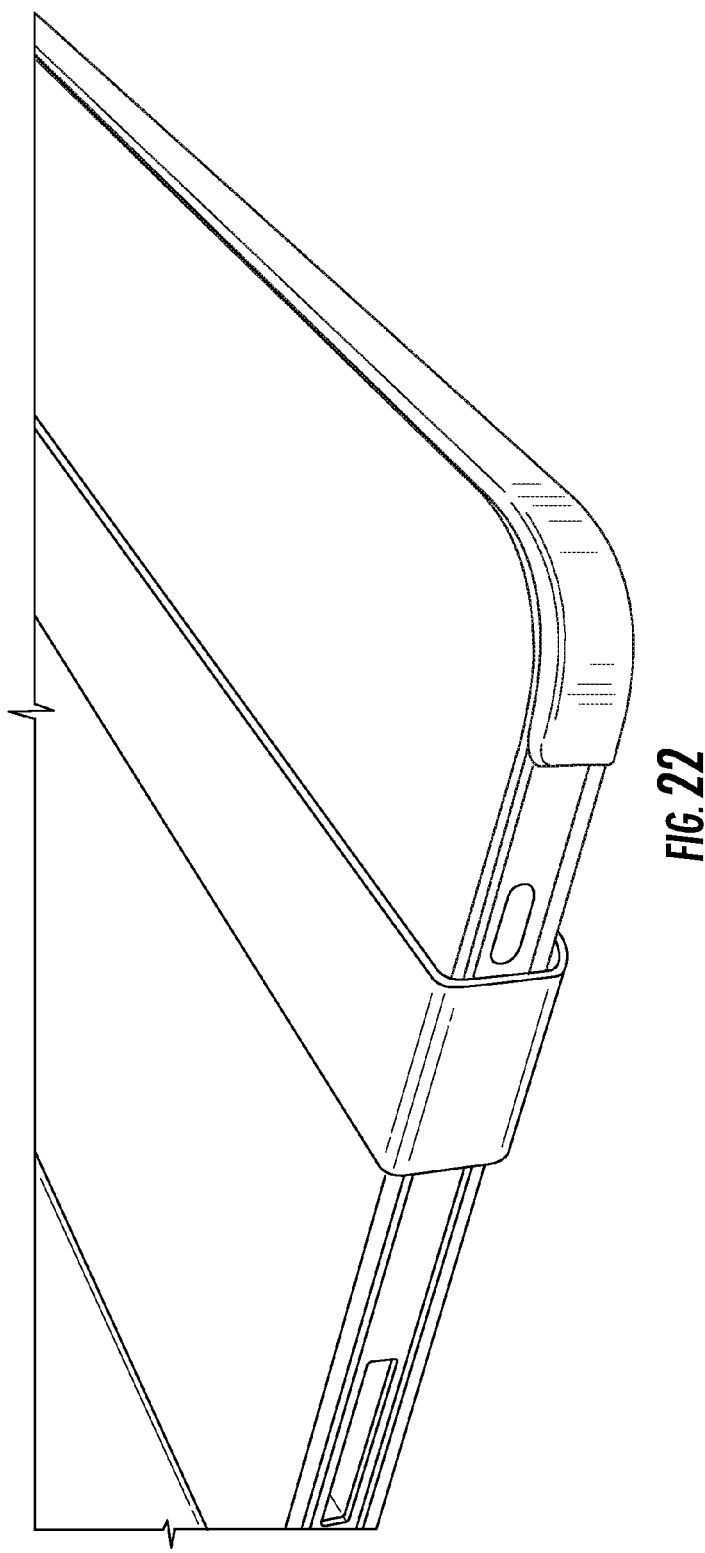
Figure 23:
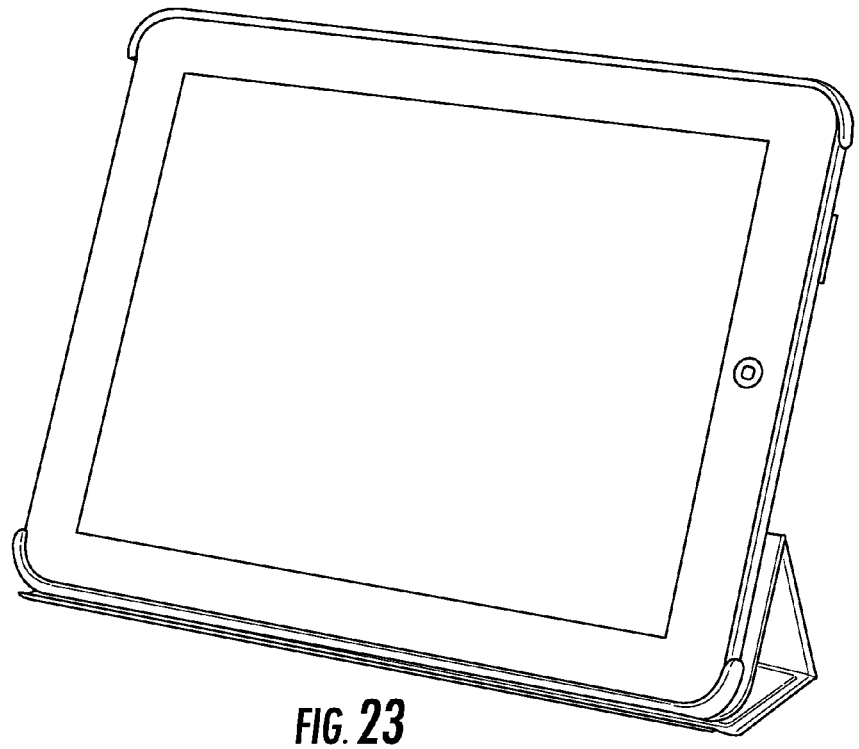
Figure 24:
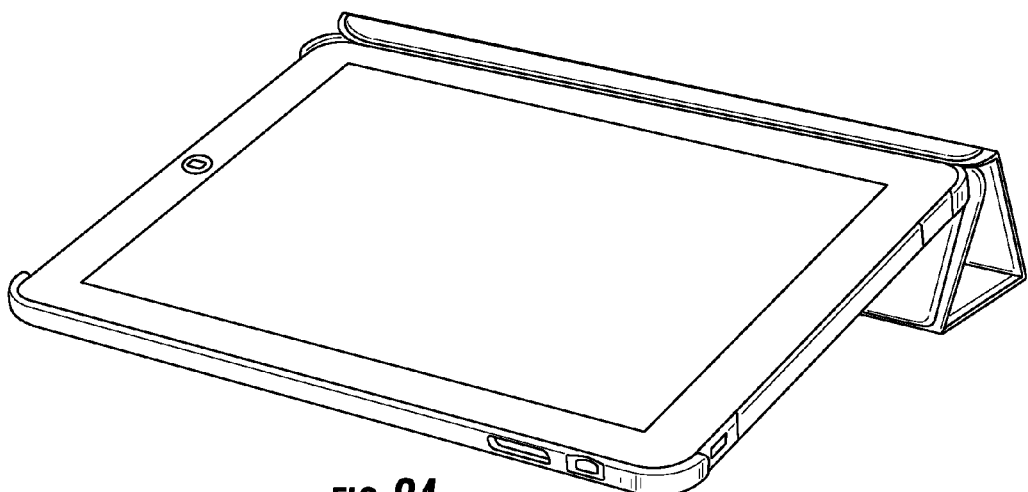
Figure 25:
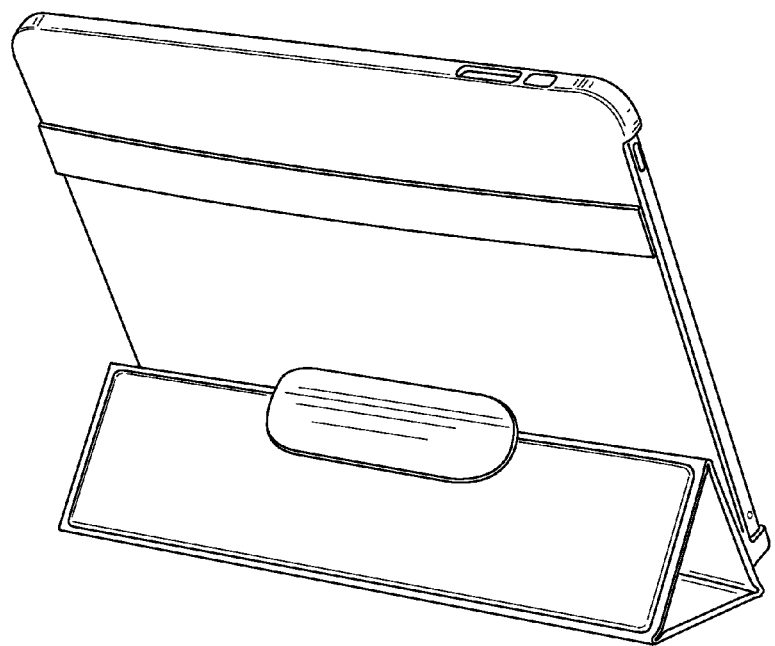
Figure 26:
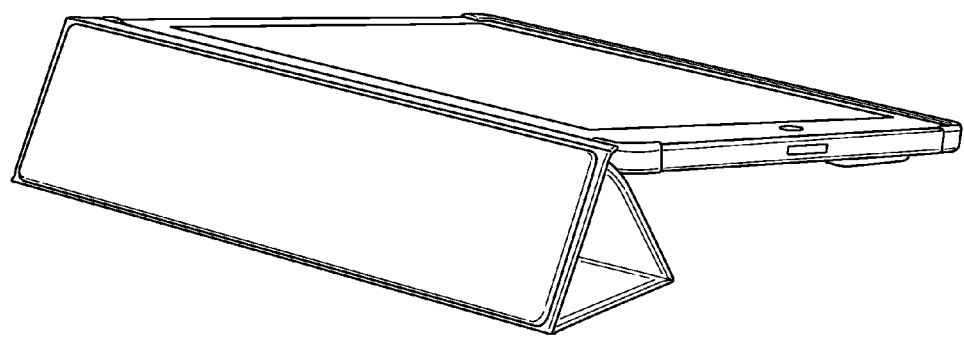

The edges of the front cover can be flat (see FIG. 22) or chamfered (see FIG. 9). The cover may be chamfered or flat partially around the edges of the front cover, or around the entire exterior surface of the front cover. This beveling may be a result of the manufacturing process of the front cover (e.g., edge welded together).

The front cover also has extension 705, which is the region used to join the front cover to the back cover. The extension can optionally include a panel (not shown) like the other sections.

In a specific implementation, the exterior and interior skin layers are the same material such as a polyurethane. In other implementations, the exterior and interior skin layers can be different materials, such as polyurethane for the exterior and polyester, suede, or fabric for the interior. The panels are made from fiberglass, which gives structural support for the stand.

The fiberglass has more rigidity than the skin layer material (e.g., polyurethane), which is in comparison more flexible. Such a composite for the case has both the rigidity properties of the fiberglass (for structural support) and the flexibility of the polyurethane for the hinges. Further the polyurethane has a cushioning property that offers some protection to the electronic tablet. Further, the hinges or fold lines that are formed by the skin give some grip to the case (and also the raised bumps on the back of the case), so that it is less likely to slip out of the user's hands.

The skin layers and panels can be made from a variety of different material. And depending on the materials, the skin layers and panels can be joined by a variety of methods. For example, the skin layers may be coatings that a deposited or otherwise formed on the panels.

Some examples of skin layer materials include polyvinyl chloride (PVC), polymer, neoprene, silicone, rubber, fabric, vinyl, plastic, thermoplastic, thermoplastic urethane-polycarbonate (TPU-PC), thermoplastic elastomer (TPE), thermoplastic polyurethane (TPU), polystyrene, cloth, leather, artificial leather, synthetic leather, synthetic leather made of plastic (sometimes referred to as pleather), poromeric imitation leather, koskin, leatherette, paint, carbon fiber, Kevlar, and many others.

Some specific techniques for attaching materials have been described in this application. However, any attachment technique or mechanism may be used to attach or bond the case pieces together. Attachment may be by way of an adhesive such as a glue (e.g., fabric glue) or epoxy. To help facilitate bonding, a bonding agent can be used. For example, portions or the entire surface of the fixed back flap can include a temperature activated adhesive that helps bond the sleeve and back flap together when heat, pressure, or both is applied. Such an adhesive can be in the form of a coating, powder, or lacquer, such as a heat sealing lacquer. Sufficient heat is applied in order to bring the temperature up to or above the activation temperature of the adhesive. Curing can occur upon cooling. Using such a bonding or adhesive process to make the case allows the case to be made quickly and cost effectively and very little labor is used.

Attachment may be by way of stitches or stitching. In this specific implementation, in a first attachment step, the sleeve is positioned over the back flap. In a second attachment step, the sleeve is stitched to the fixed back flap, but is not stitched to the movable back flap. The stitching process may include using a needle and thread. The stitching may be done using a sewing machine or may be done by hand.

Attachment may be by way of rivets. A rivet is a pin or bolt of material (e.g., metal) used for uniting two or more pieces. One end of the rivet shank has a head and an opposite end of the shank has a plain end. The plain end passes through a hole in each piece. The diameter of the head is larger than the diameter of the hole so that the rivet can not pass completely through. After passing the plain end through the hole, the plain end is beat or pressed down so as to make an another head having a diameter larger than the diameter of the hole—thus securing the material pieces together between the heads.

Attachment may be by way of welding such as plastic welding or radio frequency (RF) bonding to seal or bond the sleeve to the fixed back panel portion, but not the movable back panel portion. Some examples of specific welding techniques that may be used include hot gas welding, freehand welding, speed tip welding, extrusion welding, contact welding, hot plate welding, high frequency welding, injection welding, ultrasonic welding, friction welding, spin welding, laser welding, or solvent welding.

The case can be made in any color, combination of colors, combination of hues, or combinations of colors and hues. The skin layer can be made from a desired color, such as orange, green, blue, pink, red, taupe, beige, gray, brown, dark brown, black, magenta, silver, navy blue, turquoise, purple, violet, and white.

As discussed, the panel material typically have a greater rigidity than the skin layer material. Some examples of panel materials include wood, card stock, metal (e.g., aluminum, iron, steel, stainless steel, chromium, titanium, or others), polymer, plastic, polycarbonate (PC), polystyrene, polyvinyl chloride, a thermoplastic, thermoplastic elastomer, polymer or the like. In various implementations, the material for the skin layer and the panel may be the same (e.g., polyvinyl chloride or carbon fiber), but the panels will be made more rigid than the skin (e.g., by using thicker pieces or differently processing the materials to obtain the desired characteristics). The materials may be nonmagnetic (e.g., plastic) or have magnetic properties (e.g., iron or steel), or have a combination of both. The materials may be a foam (e.g., material having trapped bubbles) which gives more cushioning for the case, or not a foam.

The panels can be different materials from each other or combination of different materials discussed above. For example, the panels can include plastic and metal panels. For example, panel 111 can be plastic while panels 109 and 113 are metal (e.g., steel), or vice versa.

Alternatively, multiple or composite sheets or layers may be used to form the reinforcing material. Leather, synthetic leather, or vinyl can be used to sandwich a more rigid material or stiffening layer, such as flexible plastic or cardboard in between the layers. In an embodiment, an additional layer of with the reinforcing material, such as foam or other padding material, are included to provide cushioning for the electronic device.

In the implementation using polyurethane or polyvinyl chloride, heat and pressure are used to join the coatings. In other implementations, adhesives, bonding, glue, stitching, or the like are used to join the two coatings.

Although the specific implementation above has three layers, other implementation may add more layers, such as a third skin layer (e.g., spray on coating) above exterior skin layer 1101 to give a tacky surface. There can be a fourth skin layer below interior skin layer 1103 to give a mirror-like finish.

With the above technique of creating the sectional front cover, the panels are not necessarily all rounded rectangles. They can be differently sized from each other (to provide different viewing angles as discussed above). Or the sections may be made from a mosaic of different sized and shaped panels that will give the front cover a different aesthetic look. The panels can be shaped as desired and locked in place by the skin layers.

Extension 705 is formed by joining skin layers from point 1117 to 1119 to an attachment area. As discussed above, this extension may optionally include a panel (which not shown in FIG. 11). Extension 705 is the region where the front cover will be bonded or joined to the back cover. The back cover can be made from a rigid material such as polycarbonate, or any other of the materials described in this case.

Further, in other implementation, the foldable front cover of the case may be used with an electronic tablet without the specific back cover shown or described in this application. The foldable front cover can be used with other types of back covers or may be used by itself.

In other implementations, a two layer composite can be used to form the foldable front of the case. In such an implementation, one of the skin layers (either the exterior or interior) will be omitted. The composite will include a rigid panel and a relatively flexible skin layer that hold the panels together (e.g., by bonding or glue).

For example, the rigid panel can be polycarbonate and the interior is polyurethane or rubber. Such a case will have a hard outside surface (e.g., glossy surface) for the paneling, while the interior allows folding of the panels with respect to each other.

In another example, the exterior can be polyurethane or rubber which attaches the rigid panels. Since the panels face the table and likely touch the screen, the panels can be coated with a material to prevent scratching of the screen.

FIG. 11 shows a multiple layer construction for the front cover. However, alternatively, the front cover can be made using a single-layer construction (of a single material), such as from a single layer of a thermoplastic elastomer. This implementation can have any number of hinges (e.g., two or more hinges such as 3, 4, 5, or more). To create a hinge using single-layer construction, the thickness of the hinge areas of the front cover is thinner than the thickness of the panels of the front cover. See more discussion below and some specific implementations. With a single material construction, edge welding is not necessary. Then the outside edges of front cover need not have edge welding, so that the thickness around the edge can be uniform with the panels. So the edging of the cover will be about the same thickness as the areas with the panels. The hinges are thinner regions that extend completely across the width of the cover, from edge to edge.

Figures 12A, 12B:
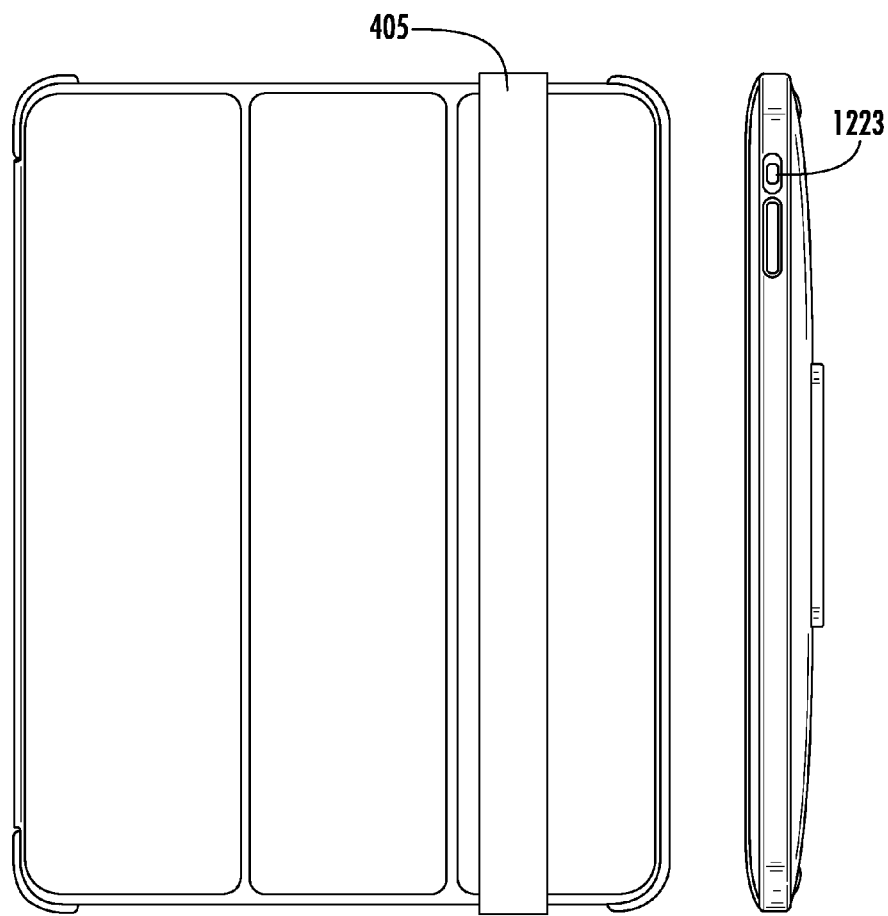
FIGS. 12A-12B show views of the case where the strap is being used to secure the front cover to the back cover.
Figure 17:
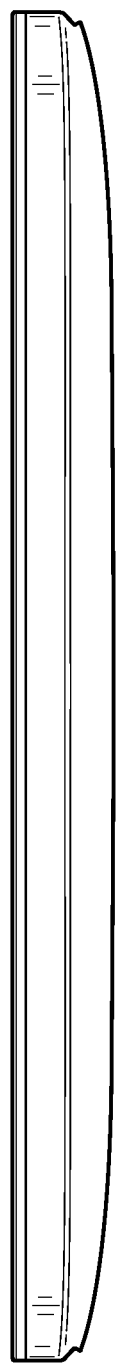

FIG. 12A shows strap 405 holding the front cover to the back cover. FIG. 12B shows the front edge of the back cover having openings 1223 for access to features of the electronic tablet without needing to remove the electronic tablet from the case. Furthermore, the back surface of back cover 405 (refer to FIG. 7) can have additional openings (not shown) such as an opening on its back surface to allow for a camera of an electronic tablet. There can be an opening for a flash of the electronic tablet. The openings will be position with respect to the camera opening to allow the camera lens to have a clear view for video and picture taking.

FIGS. 13A-13E show further views of the case and gives dimensions of various feature of the case for a specific implementation. In other implementations, the dimensions can vary depending, for example, on the size of the tablet device.

For example, in a specific implementation of the invention that may be used for Apple's iPad (which is 14 millimeters), the thickness (t1) of the case, without bumps 204 and 206, is about 19 millimeters, when an iPad is placed inside the device. Therefore, the case is very slim, adding little to the thickness of the device itself. The width W1 of the case is about 297 millimeters. The length L1 of the case when closed as shown is about 194 millimeters. The width of the strap 405 is 20 millimeters. In a specific implementation, the strap is a rubber strap. The ridges (or bumps) on the back of the case have a width W2 of 82 millimeters and a length L2 of 15 millimeters. The ridges are spaced apart from each other by a distance (x) which is about 40 millimeters and have a height (t2) of 3.5 millimeters extending from the back surface of the back cover. With the appropriate dimension changes to the case, the case can be used for an iPad 2 (which is 8.8 millimeters) which was introduced in 2011, or other tablet devices. The case includes hinges 104, 106, and 701.

Additionally, these ridges provide additional benefits. The ridges keep the case level when put on a flat surface. The ridges also protect the case from scratches and other damage. These ridges also provide greater grip on the device when it is being transported by hand.

The dimensions of the case can vary to accommodate different purposes, including the different sizes and dimensions of electronic devices being housed. In an implementation of the cover for Apple's iPad 2, the back cover has a hole or opening that is positioned to for the camera lens in the iPad 2 without it being blocked by the case.

FIGS. 14A-14E show various views a alternative case implementation (without a representative electronic device) with four panels and three hinges. This implementation also has only a single bump. The four panels give greater flexibility in the folding of the front cover as a stand. These four panels can be used with the implementation described above. As discussed above, a cover of the invention can include three or more panels such as four panels, five panels, and so forth.

The single bump will allow a single viewing angle, but the bump version described above will allow an additional working angle. As discussed above, there can be any number of bumps, one or more.

Further, the bump in this implementation has an edge profile that is less sloped than the bumps in FIG. 2A. The bumps in 2A are angled above 90 degrees with respect to the back surface of the back cover. In FIG. 14A, the bump has a gradual slope. Bumps with gradual slopes like in FIG. 14A may be used in the FIG. 2A implementation.

The above implementations use bumps to hold the stand. In other implementation, other structures can be used to hold the stand instead. The case can use a combination of bump and other structures.

As an example, FIGS. 15-26 show an implementation where a pill-shaped or oval sleeve flap (or catch) is used to hold the stand. The flap is lifted, and then the front cover, after folding, can be inserted underneath the flap to hold it in place. In an implementation, the flap or catch is made from rubber, but in other implementations, other materials can be used including silicone and a thermoplastic elastomer. Only one flap is shown in these figures, but two or more flaps (two, three, four, or more flaps) will allow for more viewing angles.

FIGS. 18 and 19 show an implementation of the front cover, where the flap extending out the rear cover is an extension of a piece of material from the front cover, pulled through a hole in the rear cover. The cover is formed from a thermoplastic polyurethane mold. In this implementation, unlike the composite method of forming the front cover as described in FIG. 11, the outer cover is made of a single type of material— thermoplastic polyurethane. In an alternative implementation, the single type of material is a thermoplastic elastomer. FIGS. 18A-18E and 19A-19E also gives dimensions of various feature of the case for a specific implementation. The width W of the case is about 244 millimeters. The length L1 of the rear cover is about 194 millimeters. The length L2 of the flap is about 194 millimeters. The thickness (t1) of the case is about 19 millimeters. In other implementations, the dimensions can vary depending, for example, on the size of the tablet device. In an implementation, the hinges 1802, 1804, 1806, and 1808 of the front cover are also made of thermoplastic elastomer. To provide flexibility at the hinges, the thickness of the hinge areas of the front cover is less than the thickness of the rest of the front cover.

FIGS. 20 and 21 show another implementation of the front cover, where the flap is made of another piece of material separate from the front cover and attached to the rear cover. The flap in FIG. 21 is made of OP™, a polyurethane (PC) laminate with a polycarbonate (PU) reinforcement structure. For example, if the front cover of FIG. 11 were made of OP, the interior and exterior skins would be polyurethane, and the panels would be made of polycarbonate. OP is a trademark of Incase Designs Corp. FIGS. 20A-20E and 21A-21E also gives dimensions of various feature of the case for a specific implementation. The width W of the case is about 246 millimeters. The length L of the rear cover is about 194 millimeters. The thickness (t) of the case is about 19 millimeters. In alternate implementations, the case can be a two-layer structure, with only one polyurethane layer (instead of two) and one polycarbonate layer. The polycarbonate layer can be the exterior layer, or the polycarbonate layer can be the interior layer (which faces a screen of the electronic device or tablet). In a specific implementation, to provide flexibility at the hinges, the thickness of the hinge areas 2002, 2004, 2006, and 2008 of the front cover is less than the thickness of the rest of the front cover. In other implementations, the dimensions can vary depending, for example, on the size of the tablet device.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A cover for an electronic device comprising:
a rectangular front cover comprising first, second, and third panels between a first edge and second edge of the front cover, wherein the first panel is closer to the second edge than the second and third panels, the second panel is between the first and third panels, and the third panel is adjacent the second panel,
between the first and second panels is a first hinge, and between the second and third panels is a second hinge;
a back cover, coupled to the front cover, which will retain the electronic device in the case; and
a third hinge, positioned between the front and back covers, where the front cover can be rotated using the third hinge so the front cover is against a screen of the electronic device in a closed position and against a back of the back cover in an open position,
wherein the front cover can be folded to provide at least two stand positions comprising a first stand position when the first hinge is rotated so the first panel and second panel have a first angle between them, and the second hinge is rotated so the second panel and third panel have a second angle between them, wherein the second panel rests against a surface upon which the stand is formed, and in the first stand position, the first, second, and third panels are folded to form sides of a triangular structure where
a first vertex of the triangular structure is at the first hinge,
a second vertex of the triangular structure is at the second hinge, and
a third vertex is at the third hinge, and the third panel extends to the third vertex, and a second stand position when the first hinge is rotated so the first panel and second panel have a third angle between them, and the second hinge is rotated so the second panel and third panel have a fourth angle between them, wherein the first panel rests against the surface upon which the stand is formed.

2. The cover of claim 1 wherein the first angle and the third angle are the same or about the same.

3. The cover of claim 1 wherein the second panel comprises a multiple-layer composite comprising:
an exterior flexible skin layer;
an interior flexible skin layer; and
a plastic rigid layer between the exterior flexible skin layer and interior flexible skin layer.

4. The cover of claim 3 wherein the plastic rigid layer comprises polycarbonate.

5. The cover of claim 3 wherein the plastic rigid layer is nonmagnetic.

6. The cover of claim 1 wherein the cover has at least one dimension of at least about 186 millimeters.

7. The cover of claim 1 wherein the second panel comprises a multiple-layer composite comprising:
an interior flexible skin layer; and
a rigid layer coupled to the interior flexible skin layer.

8. The cover of claim 7 wherein the rigid layer comprises polycarbonate.

9. The cover of claim 7 wherein the interior flexible skin layer comprises a polyurethane.

10. The cover of claim 1 comprising an exterior flexible skin layer, an interior flexible skin layer, and a rigid layer between the exterior and interior flexible skin layers, wherein the exterior flexible skin layer is welded to the interior flexible skin layer.

11. The cover of claim 1 wherein the first angle is about 60 degrees.

12. The cover of claim 11 wherein the third angle is about 60 degrees.

13. The cover of claim 1 wherein the first panel is adjacent to the second edge.

14. The cover of claim 1 wherein the front cover comprises a molded flexible skin layer comprising the first and second.

15. The cover of claim 1 wherein the front cover comprises a fourth hinge, parallel to the first hinge and positioned further away from the first edge than the first hinge.

16. The cover of claim 1 wherein the front cover comprises a fourth hinge, parallel to the first hinge and positioned closer to the first edge than the first hinge.

17. The cover of claim 1 wherein the second panel comprises at least a single layer comprising a thermoplastic elastomer material.

18. The cover of claim 17 wherein in a region of the first hinge, a thickness of the front cover is thinner than in a region of the first panel.

19. The cover of claim 1 wherein the front cover comprises a first dimension in a first direction, a second dimension in a second direction, the first dimension is longer than the second dimension, and the first and second hinges extend in the first direction.

20. The cover of claim 1 wherein the front cover comprises a first dimension in a first direction, a second dimension in a second direction, the first dimension is longer than the second dimension, and the first and second hinges extend in the first direction.

21. The cover of claim 20 wherein the front cover comprises a fourth panel between the first and second edge, the fourth panel is adjacent the third panel, and between the third panel and fourth panel is a fourth hinge.

22. The cover of claim 1 wherein the front cover comprises a fourth panel between the first and second edge, the fourth panel is adjacent the third panel, and between the third panel and fourth panel is a fourth hinge.

23. The cover of claim 1 wherein the first and second angles are the same or about the same.

24. The cover of claim 1 wherein the third and fourth angles are the same or about the same.

25. The cover of claim 1 wherein the first and second angles are the same or about the same, and the third and fourth angles are the same or about the same.

26. The cover of claim 1 wherein the panels comprise an exterior material comprising leather.

27. The cover of claim 1 wherein the panels comprise an exterior material comprising polyurethane.

28. The cover of claim 1 wherein the panels comprise an exterior material comprising vinyl.

29. The cover of claim 1 wherein the panels comprise an interior material comprising microfiber.

30. The cover of claim 1 wherein the panels comprise an exterior material comprising leather and an interior material comprising microfiber.

31. The cover of claim 1 wherein the panels comprise an exterior material comprising polyurethane and an interior material comprising microfiber.

32. The cover of claim 1 wherein the second panel comprises a multiple-layer composite comprising:
an exterior flexible layer comprising leather;
an interior flexible layer comprising microfiber; and
a rigid layer between the exterior flexible layer and interior flexible layer, wherein the rigid layer has greater rigidity than the flexible layers.

33. The cover of claim 1 wherein the second panel comprises a multiple-layer composite comprising:
an exterior flexible layer comprising polyurethane;
an interior flexible layer comprising microfiber; and
a rigid layer between the exterior flexible layer and interior flexible layer, wherein the rigid layer has greater rigidity than the flexible layers.

34. The cover of claim 1 wherein in the first stand position, the first, second, and third panels are folded to form nonoverlapping sides of the triangular structure, there is not an intervening panel between a panel closest to the first edge and the first edge, and the panel closest to the first edge does not overlap with any other panel in forming the triangular structure.

35. The cover of claim 1 wherein in the first stand position, the first, second, and third panels are folded to form sides of the triangular structure, and each of the first, second, and third panels does not overlap with any other panel.

36. The cover of claim 1 wherein in the second stand position, the first, second, and third panels are folded to form nonoverlapping sides of a triangular structure, there is not an intervening panel between a panel closest to the first edge and the first edge, and the panel closest to the first edge does not overlap with any other panel in forming the triangular structure.

37. The cover of claim 1 wherein in the first stand position, the first, second, and third panels are folded to form nonoverlapping sides of a first triangular structure, and in forming the first triangular structure, there is not an intervening panel between a panel closest to the first edge and the first edge, and the panel closest to the first edge does not overlap with any other panel, and
in the second stand position, the first, second, and third panels are folded to form nonoverlapping sides of a second triangular structure, and in forming the second triangular structure, there is not an intervening panel between a panel closest to the first edge and the first edge, and the panel closest to the first edge does not overlap with any other panel.

38. The cover of claim 1 wherein the second panel comprises a multiple-layer composite comprising:
an exterior flexible layer;
an interior flexible layer; and
a rigid layer between the exterior flexible layer and interior flexible layer, wherein the rigid layer has greater rigidity than the flexible layers, and
in the first stand position, the first, second, and third panels are folded to form sides of the triangular structure, and each of the first, second, and third panels does not overlap with any other panel.

39. The cover of claim 1 wherein the second panel comprises a multiple-layer composite comprising:
an exterior flexible layer;
an interior flexible layer; and
a rigid layer between the exterior flexible layer and interior flexible layer, wherein the rigid layer has greater rigidity than the flexible layers, and
in the first stand position, the first, second, and third panels are folded to form nonoverlapping sides of the triangular structure, and in forming the triangular structure, there is not an intervening panel between a panel closest to the first edge and the first edge, and the panel closest to the first edge does not overlap with any other panel.

40. The cover of claim 1 wherein from the first edge to the second edge of the front cover, there are at most three panels.

41. The cover of claim 1 wherein in the first stand position, the first, second, and third panels are folded to form nonoverlapping sides of a triangular structure, and from the first edge to the second edge of the front cover, there are at most three panels.

42. The cover of claim 1 wherein the panels comprise a multiple-layer composite comprising:
an exterior flexible layer;
an interior flexible layer; and
a rigid layer between the exterior flexible layer and interior flexible layer, wherein the rigid layer has greater rigidity than the flexible layers, and
in the first stand position, the first, second, and third panels are folded to form nonoverlapping sides of the triangular structure, and from the first edge to the second edge of the front cover, there are at most three panels.

43. The cover of claim 1 wherein a width of the first panel between the first hinge and second edge is the same as a width of the second panel between the first and second hinges.

44. A cover for an electronic device comprising:
a rectangular front cover comprising first, second, and third panels between a first edge and second edge of the front cover, wherein the first panel is closer to the second edge than the second and third panels, the second panel is between the first and third panels, and the third panel is adjacent the second panel, between the first and second panels is a first hinge, and between the second and third panels is a second hinge;

a back cover, coupled to the front cover, which will retain the electronic device in the case; and a third hinge, positioned between the front and back covers, where the front cover can be rotated using the third hinge so the front cover is against a screen of the electronic device in a closed position and against a back of the back cover in an open position, wherein the front cover can be folded to provide at least two stand positions comprising a first stand position when the first hinge is rotated so the first panel and second panel have a first angle between them, and the second hinge is rotated so the second panel and third panel have a second angle between them, wherein the second panel rests against a surface upon which the stand is formed, and a second stand position when the first hinge is rotated so the first panel and second panel have a third angle between them, and the second hinge is rotated so the second panel and third panel have a fourth angle between them, wherein the first panel rests against the surface upon which the stand is formed, and the first panel and third panel have the same length dimensions.

45. An accessory for an electronic device comprising:

a front cover comprising first, second, third, and fourth panels between a first edge and second edge of the front cover, wherein the first panel is adjacent the second edge, the second panel is between the first and third panels, and the third panel is between the second and fourth panels, between the first and second panels is a first hinge, between the second and third panels is a second hinge, and between the third and fourth panels is a third hinge;

a back cover, coupled to the front cover, which will retain the electronic device in the case; and a fourth hinge, positioned between the front and back covers, where the front cover can be rotated using the fourth hinge so the front cover is against a screen of the electronic device in a closed position and against a back of the back cover in an open position, wherein the front cover can be folded to provide at least two stand positions for the electronic device by rotating the first, second, and third hinges, the front cover has a rounded rectangular shape, and each of the panels is formed using a three-layer composite comprising:

a first flexible layer;

a second flexible layer; and a rigid layer between the first and second flexible layers, wherein the rigid layer has greater rigidity than the first and second flexible layers.

46. The cover of claim 45 wherein the first, second, and third hinges are parallel to each other.

47. The cover of claim 45 wherein the first flexible layer is an exterior layer comprising polyurethane.

48. The accessory of claim 45 wherein in a first stand position, a panel, coupled to the second hinge, rests against a surface upon which the stand is formed, and in a second position, a panel, coupled to the first hinge, rests against the surface upon which the stand is formed.

49. The accessory of claim 45 wherein the front cover comprises at least one dimension of at least about 186 millimeters.

50. The accessory of claim 45 wherein the front cover comprises a first dimension in a first direction, a second dimension in a second direction, the first dimension is longer than the second dimension, and the first and second hinges extend in the first direction.

51. An accessory for an electronic device comprising:

a first cover portion to retain the electronic device, wherein the first cover portion covers a back of the electronic device and is configured so a first hinge is positioned between the first cover portion and a second cover portion, the second cover portion, coupled to the first hinge, can be rotated using the first hinge so the second cover portion covers a screen of the electronic device in a closed position and is against a back of the first cover portion in an open position, the second cover portion comprises first, second, and third panels between a first edge and second edge of the second cover portion, wherein the first panel is closer to the second edge than the second and third panels, the second panel is between the first and third panels, and the third panel is adjacent the second panel, between the first and second panels is a second hinge, between the second and third panels is a third hinge, and the second cover portion can be folded to provide at least two stand positions comprising a first stand position where the first, second, and third panels are folded to form sides of a first triangular structure, the second panel rests against a surface upon which the stand is formed, a first vertex of the first triangular structure is at the first hinge, a second vertex of the first triangular structure is at the second hinge, a third vertex is at the third hinge, and the first panel extends to the first vertex, and a second stand position where the first, second, and third panels are folded to form sides of a second triangular structure, and the back of the first cover portion rests against the first panel.

52. The accessory of claim 51 wherein the panels of the second cover portion comprise a multiple-layer composite comprising:

an exterior flexible layer;

an interior flexible layer; and a rigid layer between the exterior and interior flexible layers, wherein the rigid layer has greater rigidity than the flexible layers, and in the first stand position, the first, second, and third panels are folded to form nonoverlapping sides of a triangular structure, and from the first edge to the second edge of the front cover, there are at most three panels.

53. The accessory of claim 51 wherein the panels of the second cover portion comprise an exterior material comprising leather.

54. The accessory of claim 51 wherein the panels of the second cover portion comprise an exterior material comprising polyurethane.

55. The accessory of claim 51 wherein the panels of the second cover portion comprise an interior material comprising microfiber.

56. The accessory of claim 51 wherein the first cover portion comprises a polycarbonate having greater rigidity than flexible layers of the panels of the second cover portion.

57. An accessory for an electronic device comprising:
a first cover portion comprising first, second, and third panels between a first edge and second edge of the first cover portion, wherein the first panel is closer to the second edge than the second and third panels, the second panel is between the first and third panels, and the third panel is adjacent the second panel,
between the first and second panels is a first hinge, and
between the second and third panels is a second hinge; and
a second cover portion to retain the electronic device, wherein the second cover portion covers a back of the electronic device and is configured so a third hinge is positioned between the first cover portion and a second cover portion, and the first cover portion can be rotated using the third hinge so the first cover portion is against a screen of the electronic device in a closed position and against a back of the second cover portion in an open position,
the first cover portion can be folded to provide at least two stand positions comprising
a first stand position where the first, second, and third panels are folded to form nonoverlapping sides of a first triangular structure, the second panel rests against a surface upon which the stand is formed, a first vertex of the first triangular structure is at the first hinge, a second vertex of the first triangular structure is at the second hinge, a third vertex is at the third hinge, and the first panel extends to the third vertex, and
a second stand position where the first, second, and third panels are folded to form nonoverlapping sides of a second triangular structure, and the back of the second cover portion rests against the first panel, and
in forming the triangular structures of the first and second stand positions, there is not an intervening panel between a panel closest to the second edge and the second edge, and the panel closest to the second edge does not overlap with any other panel.

58. The accessory of claim 57 wherein the panels of the first cover portion comprise a multiple-layer composite comprising:
an exterior flexible layer comprising leather;
an interior flexible layer comprising microfiber; and
a rigid layer between the exterior flexible layer and interior flexible layer, wherein the rigid layer has greater rigidity than the flexible layers.

59. The accessory of claim 57 wherein the panels of the first cover portion comprise a multiple-layer composite comprising:
an exterior flexible layer comprising polyurethane;
an interior flexible layer comprising microfiber; and
a rigid layer between the exterior flexible layer and interior flexible layer, wherein the rigid layer has greater rigidity than the flexible layers.

60. The accessory of claim 57 wherein from the first edge to the second edge of the first cover portion, there are at most three panels.

61. An accessory for an electronic device comprising:
a first cover portion to retain the electronic device, wherein the first cover portion covers a back of the electronic device and is configured so a first hinge is positioned between the first cover portion and a second cover portion,
the second cover portion, coupled to the first hinge, can be rotated using the first hinge so the second cover portion covers a screen of the electronic device in a closed position and is against a back of the first cover portion in an open position,
the second cover portion comprises first, second, third, and fourth panels between a first edge and second edge of the front cover, wherein the first panel is adjacent the second edge, the second panel is between the first and third panels, and the third panel is between the second and fourth panels,
between the first and second panels is a second hinge,
between the second and third panels is a third hinge,
between the third and fourth panels is a fourth hinge, and
the second cover portion can be folded to provide at least two stand positions comprising
a first stand position where the second, third, and fourth panels are folded to form sides of a first triangular structure, and
a second stand position where the second, third, and fourth panels are folded to form sides of a second triangular structure.

62. The accessory of claim 61 wherein the panels of the second cover portion comprise a multiple-layer composite comprising:
an exterior flexible layer;
an interior flexible layer; and
a rigid layer between the exterior flexible layer and interior flexible layer, wherein the rigid layer has greater rigidity than the flexible layers, and
in the first stand position, the first, second, and third panels are folded to form nonoverlapping sides of a triangular structure, and from the first edge to the second edge of the front cover, there are at most three panels.

63. The accessory of claim 61 wherein the panels of the second cover portion comprise an exterior material comprising leather.

64. The accessory of claim 61 wherein the panels of the second cover portion comprise an exterior material comprising polyurethane.

65. The accessory of claim 61 wherein the panels of the second cover portion comprise an interior material comprising microfiber.

66. The accessory of claim 61 wherein the first cover portion comprises a polycarbonate having greater rigidity than flexible layers of the panels of the second cover portion.

67. An accessory for an electronic device comprising:
a first cover portion comprising first, second, and third panels between a first edge and second edge of the first cover portion, wherein the first panel is closer to the second edge than the second and third panels, the second panel is between the first and third panels, and the third panel is adjacent the second panel,
between the first and second panels is a first hinge, and
between the second and third panels is a second hinge; and
a second cover portion to retain the electronic device, wherein the second cover portion covers a back of the electronic device and is configured so a third hinge is positioned between the first cover portion and a second cover portion, and the first cover portion can be rotated using the third hinge so the first cover portion is against a screen of the electronic device in a closed position and against a back of the second cover portion in an open position,
the first cover portion can be folded to provide at least two stand positions for the electronic device by rotating the first, second, and third hinges,
in a first stand position, the first, second, and third panels are folded to form sides of a triangular structure where a first vertex of the triangular structure is at the first hinge, a second vertex of the triangular structure is at the second hinge, a third vertex is at the third hinge, and the first panel extends to the third vertex, and each of the panels is formed using a multiple-layer composite comprising a first flexible layer, a second flexible layer, and a rigid layer between the first and second flexible layers, wherein the rigid layer has greater rigidity than the first and second flexible layers.

68. The accessory of claim 67 wherein the first flexible layer comprises leather.

69. The accessory of claim 67 wherein the first flexible layer comprises polyurethane.

70. The accessory of claim 67 wherein the second flexible layer comprises an interior material comprises microfiber.

71. The accessory of claim 67 wherein the rigid layer comprises a polymer.

72. The accessory of claim 67 wherein in at least one of the two stand positions, panels are rotated by way of the first, second, and third hinges to form a triangular structure.

73. An accessory for an electronic device comprising:

a first cover portion comprising first, second, third, and fourth panels between a first edge and second edge of the first cover portion, wherein the first panel is closer to the second edge than the second and third panels, the second panel is between the first and third panels, and the third panel is between the second and fourth panels, between the first and second panels is a first hinge, between the second and third panels is a second hinge, and between the third and fourth panels is a third hinge; and a second cover portion to retain the electronic device, wherein the second cover portion covers a back of the electronic device and is configured so a fourth hinge is positioned between the first cover portion and a second cover portion, and the first cover portion can be rotated using the fourth hinge so the first cover portion is against a screen of the electronic device in a closed position and against a back of the second cover portion in an open position, and the first cover portion can be folded to provide at least two stand positions comprising a first stand position where the second, third, and fourth panels are folded to form sides of a first triangular structure, and a second stand position where the second, third, and fourth panels are folded to form sides of a second triangular structure.

74. The accessory of claim 73 wherein the panels of the second cover portion comprise a multiple-layer composite comprising:

an exterior flexible layer;

an interior flexible layer; and a rigid layer between the exterior flexible layer and interior flexible layer, wherein the rigid layer has greater rigidity than the flexible layers.

75. An accessory for an electronic device comprising:

a first cover portion comprising first, second, and third panels between a first edge and second edge of the first cover portion, wherein the first panel is closer to the second edge than the second and third panels, the second panel is between the first and third panels, and the third panel is adjacent the second panel, between the first and second panels is a first hinge, and between the second and third panels is a second hinge; and a third hinge, coupled to the first cover portion, wherein the third hinge is positioned between the first cover portion and a second cover portion, the second cover portion to retain the electronic device, and the first cover portion can be rotated using the third hinge so the first cover portion is against a screen of the electronic device in a closed position and against a back of the second cover portion in an open position, each of the panels of the first cover portion is formed using a multiple-layer composite comprising an exterior flexible layer, an interior flexible layer, and a rigid layer between the exterior and interior flexible layers, wherein the rigid layer has greater rigidity than the flexible layers, and the first cover portion can be folded to provide at least two stand positions comprising a first stand position where the first, second, and third panels are folded to form sides of a first triangular structure, the second panel rests against a surface upon which the stand is formed, a first vertex of the first triangular structure is at the first hinge, a second vertex of the first triangular structure is at the second hinge, a third vertex is at the third hinge, and the first panel extends to the third vertex, and a second stand position where the first, second, and third panels are folded to form sides of a second triangular structure, and the back of the second cover portion rests against the first panel.

76. The accessory of claim 75 wherein the panels of the first cover portion comprise an exterior material comprising leather and an interior material comprising microfiber.

77. The accessory of claim 75 wherein the panels of the second cover portion comprise an exterior material comprising polyurethane and an interior material comprising microfiber.

78. The accessory of claim 75 wherein the second cover portion comprises a polycarbonate having greater rigidity than flexible layers of the panels of the first cover portion.

79. The accessory of claim 75 wherein in forming the triangular structures, sides of the triangular structures are nonoverlapping, there is not an intervening panel between a panel closest to the second edge and the second edge, and the panel closest to the second edge does not overlap with any other panel.

80. The accessory of claim 75 wherein in forming the triangular structures, sides of the triangular structures are nonoverlapping, there is not an intervening panel between a panel closest to the first edge and the first edge, and the panel closest to the first edge does not overlap with any other panel.

81. The accessory of claim 75 wherein from the first edge to the second edge of the first cover portion, there are at most three panels.

82. The accessory of claim 75 wherein from the first edge to the second edge of the first cover portion, there are at most four panels.

83. An accessory for an electronic device comprising:

a first cover portion comprising first, second, and third panels between a first edge and second edge of the first cover portion, wherein the first panel is closer to the second edge than the second and third panels, the second panel is between the first and third panels, and the third panel is adjacent the second panel, between the first and second panels is a first hinge, and between the second and third panels is a second hinge; and a third hinge, coupled to the first cover portion, wherein the third hinge is positioned between the first cover portion and a second cover portion,
the second cover portion to retain the electronic device, and the first cover portion can be rotated using the third hinge so the first cover portion is against a screen of the electronic device in a closed position and against a back of the second cover portion in an open position,
each of the panels of the first cover portion is formed using a multiple-layer composite comprising
an exterior flexible layer,
an interior flexible layer, and
a rigid layer between the exterior and interior flexible layers, wherein the rigid layer has greater rigidity than the flexible layers, and
the first cover portion can be folded to provide at least two stand positions comprising
a first stand position where the first, second, and third panels are folded to form sides of a first triangular structure, the first panel faces toward the back of the second cover portion, a first vertex of the first triangular structure is at the first hinge, a second vertex of the first triangular structure is at the second hinge, a third vertex is at the third hinge, and the first panel extends to the third vertex, and
a second stand position where the first, second, and third panels are folded to form sides of a second triangular structure, and the back of the second cover portion rests against the first panel.

84. The accessory of claim 83 wherein the panels of the first cover portion comprise an exterior material comprising leather and an interior material comprising microfiber.

85. The accessory of claim 83 wherein the panels of the second cover portion comprise an exterior material comprising polyurethane and an interior material comprising microfiber.

86. The accessory of claim 83 wherein the second cover portion comprises a polycarbonate having greater rigidity than flexible layers of the panels of the first cover portion.

87. The accessory of claim 83 wherein in forming the triangular structures, sides of the triangular structures are nonoverlapping, there is not an intervening panel between a panel closest to the second edge and the second edge, and the panel closest to the second edge does not overlap with any other panel.

88. The accessory of claim 83 wherein in forming the triangular structures, sides of the triangular structures are nonoverlapping, there is not an intervening panel between a panel closest to the first edge and the first edge, and the panel closest to the first edge does not overlap with any other panel.

89. The accessory of claim 83 wherein from the first edge to the second edge of the first cover portion, there are at most three panels.

90. The accessory of claim 83 wherein from the first edge to the second edge of the first cover portion, there are at most four panels.

* * * * *